United States Patent
Li et al.

(10) Patent No.: US 11,902,073 B2
(45) Date of Patent: Feb. 13, 2024

(54) SIGNAL TRANSMISSION METHOD AND APPARATUS

(71) Applicant: Huawei Technologies Co., Ltd., Shenzhen (CN)

(72) Inventors: Xu Li, Shenzhen (CN); Jingjing Huang, Shenzhen (CN); Junping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/986,406

(22) Filed: Nov. 14, 2022

(65) Prior Publication Data
US 2023/0084731 A1 Mar. 16, 2023

Related U.S. Application Data

(63) Continuation of application No. PCT/CN2021/088844, filed on Apr. 22, 2021.

(30) Foreign Application Priority Data

May 15, 2020 (CN) .......................... 202010414393.6

(51) Int. Cl.
*H04L 27/26* (2006.01)
*H04L 5/00* (2006.01)

(52) U.S. Cl.
CPC ........ *H04L 27/2628* (2013.01); *H04L 5/0048* (2013.01); *H04L 27/2634* (2013.01)

(58) Field of Classification Search
CPC .... H04B 10/116; H04B 10/516; H04B 10/50; H04B 10/54; H04B 10/60; H04B 10/616; H04L 27/2627; H04L 5/0007
See application file for complete search history.

(56) References Cited

U.S. PATENT DOCUMENTS

| | | | |
|---|---|---|---|
| 2017/0070298 A1 | 3/2017 | Elgala et al. | |
| 2017/0201321 A1 | 7/2017 | Uysal et al. | |
| 2020/0162159 A1* | 5/2020 | Wei ...................... | H04B 10/116 |

(Continued)

FOREIGN PATENT DOCUMENTS

| | | |
|---|---|---|
| CN | 105024754 A | 11/2015 |
| CN | 105589506 A | 5/2016 |

(Continued)

OTHER PUBLICATIONS

Hussein, A., et al., "Lightweight Multi-carrier Modulation for IoT", Proceedings vol. 10559, Broadband Access I Communication Technologies XII; 105590W (2018), Event: SPIE OPTO 2018, Jan. 2018, 10 Pages, San Francisco, California, United States.

*Primary Examiner* — David S Huang

(74) *Attorney, Agent, or Firm* — Slater Matsil, LLP

(57) ABSTRACT

This application provides a signal transmission method and apparatus. The method includes: obtaining, by a transmitter side, a first signal with N points; performing signal separation on the first signal with N points, to obtain two groups of signals (for example, a second signal with N points and a third signal with N points); combining the two groups of signals obtained through separation, to obtain a to-be-sent signal with 3N/2 points; and sending the signal with 3N/2 points to a receiver side, to enable the receiver to restore the first signal with N points from the received signal with 3N/2 points.

20 Claims, 7 Drawing Sheets

(56) References Cited

U.S. PATENT DOCUMENTS

| | | | |
|---|---|---|---|
| 2022/0070864 A1* | 3/2022 | Jeon | H04L 25/061 |
| 2022/0255628 A1* | 8/2022 | Linnartz | H04B 10/61 |
| 2022/0263699 A1* | 8/2022 | Linnartz | H04B 10/54 |

FOREIGN PATENT DOCUMENTS

| | | |
|---|---|---|
| CN | 110870223 A | 3/2020 |
| CN | 110932788 A | 3/2020 |
| JP | 2010130030 A | 6/2010 |

* cited by examiner

SIGNAL TRANSMISSION METHOD AND APPARATUS

CROSS-REFERENCE TO RELATED APPLICATIONS

This application is a continuation of International Application No. PCT/CN2021/088844, filed on Apr. 22, 2021, which claims priority to Chinese Patent Application No. 202010414393.6, filed on May 15, 2020. The disclosures of the aforementioned applications are hereby incorporated by reference in their entireties.

TECHNICAL FIELD

This application relates to the communication field, and more specifically, to a signal transmission method and apparatus

BACKGROUND

A visible light communication (VLC) system that uses visible light as a signal carrier operates in an unlicensed frequency band. The system enjoys high security and low energy consumption, and can resist electromagnetic interference, thereby attracting considerable attention in application of next-generation indoor communication. An electrical signal carried on an optical signal for transmission may be an orthogonal frequency division multiplexing (OFDM) signal. In orthogonal frequency division multiplexing modulation of the visible light communication system, a light intensity indicates a baseband signal of an OFDM signal, and the light intensity can only be a positive real number. Therefore, the baseband signal of the OFDM signal needs to be a non-negative real number.

In the existing solution in which an electrical signal is carried on an optical signal for signal transmission, it is ensured that a baseband signal of an OFDM signal is a non-negative real number at the expense of spectral efficiency and/or power consumption. Therefore, how to improve spectral efficiency without increasing power consumption while ensuring that a baseband signal of an OFDM signal is a non-negative real number becomes an urgent problem to be resolved.

SUMMARY

This application provides a signal transmission method and apparatus, to improve spectral efficiency without increasing power consumption while ensuring that a baseband signal of an OFDM signal is a non-negative real number.

According to a first aspect, a signal transmission method is provided. The signal transmission method may be performed by a transmitter, or a chip or a circuit disposed in a transmitter. This is not limited in this application.

It should be noted that a device for sending a signal in this application may be referred to as a transmitter, a transmit end, a sending device, or a first device. A name of the transmit end is not limited in this application, and the transmit end may be referred to as a transmitter below for ease of description.

The signal transmission method includes:
obtaining a first signal with N points, where N is a positive even number; determining a second signal with N points and a third signal with N points based on the first signal with N points, where the second signal with N points is used to determine a fourth signal with N/2 points and a fifth signal with N/2 points, and the third signal with N points is used to determine a sixth signal with N/2 points and a seventh signal with N/2 points; determining an eighth signal with 3N/2 points based on the fourth signal with N/2 points, the fifth signal with N/2 points, the sixth signal with N/2 points, and the seventh signal with N/2 points; and sending the eighth signal with 3N/2 points. The second signal with N points is obtained by setting a signal at an even location in the first signal with N points to 0, and the third signal with N points is obtained by setting a signal at an odd location in the first signal with N points to 0.

In the signal transmission method provided in this application, the transmitter separates the obtained first signal with N points, to obtain two groups of signals; combines the two groups of signals obtained through separation, to obtain the to-be-sent signal with 3N/2 points; and sends the signal with 3N/2 points to a receiver side, to enable the receiver to restore the first signal with N points from the received signal with 3N/2 points. This can improve spectral efficiency of signal transmission without increasing power consumption while ensuring that a baseband signal of a to-be-sent signal (for example, an OFDM signal) is a non-negative real number.

With reference to the first aspect, in some implementations of the first aspect, the method further includes: performing inverse fast Fourier transform IFFT or fast Fourier transform FFT on the second signal with N points, to obtain a ninth signal with N points, where the fourth signal with N/2 points is obtained by setting negative parts of the first N/2 points of the ninth signal with N points to 0, or by setting positive parts of the last N/2 points of the ninth signal with N points to 0 and calculating an absolute value of negative parts of the last N/2 points of the ninth signal with N points, and the fifth signal with N/2 points is obtained by setting the positive parts of the first N/2 points of the ninth signal with N points to 0 and calculating an absolute value of the negative parts of the first N/2 points of the ninth signal with N points, or by setting the negative parts of the last N/2 points of the ninth signal with N points to 0; and performing IFFT or FFT on the third signal with N points, to obtain a tenth signal with N points, where the sixth signal with N/2 points is obtained by setting negative parts of the first N/2 points or last N/2 points of the tenth signal with N points to 0, and the seventh signal with N/2 points is obtained by setting positive parts of the first N/2 points or last N/2 points of the tenth signal with N points to 0 and calculating an absolute value of the negative parts of the first N/2 points or last N/2 points of the tenth signal with N points.

The two groups of signals obtained through separation meet symmetry or antisymmetry after FFT or IFFT. Four signals with N/2 points that are combined to obtain the signal with 3N/2 points are determined based on signals obtained through FFT or IFFT. Because the two groups of signals obtained through separation meet symmetry or antisymmetry after FFT and IFFT, the signal with 3N/2 points can be obtained through combination. This provides a principle that signal separation needs to meet.

In addition, in this application, the transmitter may further separate the first signal with N points, to obtain more than two groups of signals. Signals obtained after FFT or IFFT is performed on the more than two groups of signals also meet symmetry or antisymmetry. For ease of description in this application, an example in which two groups of signals are obtained through separation is used for description.

With reference to the first aspect, in some implementations of the first aspect, the determining an eighth signal with 3N/2 points based on the fourth signal with N/2 points, the fifth signal with N/2 points, the sixth signal with N/2 points, and the seventh signal with N/2 points includes: the eighth signal with 3N/2 points includes either an eleventh signal with N/2 points or a twelfth signal with N/2 points, a thirteenth signal with N/2 points, and a fourteenth signal with N/2 points; or the eighth signal with 3N/2 points includes either a thirteenth signal with N/2 points or a fourteenth signal with N/2 points, an eleventh signal with N/2 points, and a twelfth signal with N/2 points. The eleventh signal with N/2 points is determined based on the fourth signal with N/2 points and the sixth signal with N/2 points. The twelfth signal with N/2 points is determined based on the fourth signal with N/2 points and the seventh signal with N/2 points. The thirteenth signal with N/2 points is determined based on the fifth signal with N/2 points and the sixth signal with N/2 points. The fourteenth signal with N/2 points is determined based on the fifth signal with N/2 points and the seventh signal with N/2 points.

Specifically, to improve spectral efficiency of signal transmission, after determining the four signals with N/2 points that are combined to obtain the signal with 3N/2 points, the transmitter only needs to select three out of the four signals with N/2 points, and send the three signals with N/2 points to the receiver. Alternatively, the transmitter may determine only three signals with N/2 points that need to be sent. This application provides different combination manners to obtain the signal with 3N/2 points. This can improve flexibility of the solution.

With reference to the first aspect, in some implementations of the first aspect, that the eleventh signal with N/2 points is determined based on the fourth signal with N/2 points and the sixth signal with N/2 points includes: summing up a signal at a location corresponding to the fourth signal with N/2 points and a signal at a location corresponding to the sixth signal with N/2 points, to obtain a signal with N/2 points included in the eleventh signal with N/2 points. That the twelfth signal with N/2 points is determined based on the fourth signal with N/2 points and the seventh signal with N/2 points includes: summing up a signal at a location corresponding to the fourth signal with N/2 points and a signal at a location corresponding to the seventh signal with N/2 points, to obtain a signal with N/2 points included in the twelfth signal with N/2 points. That the thirteenth signal with N/2 points is determined based on the fifth signal with N/2 points and the sixth signal with N/2 points includes: summing up a signal at a location corresponding to the fifth signal with N/2 points and a signal at a location corresponding to the sixth signal with N/2 points, to obtain a signal with N/2 points included in the thirteenth signal with N/2 points. That the fourteenth signal with N/2 points is determined based on the fifth signal with N/2 points and the seventh signal with N/2 points includes: summing up a signal at a location corresponding to the fifth signal with N/2 points and a signal at a location corresponding to the seventh signal with N/2 points, to obtain a signal with N/2 points included in the fourteenth signal with N/2 points.

In a possible implementation, the four signals with N/2 points may be determined by summing up the signals obtained after FFT or IFFT is performed on the two groups of signals obtained through separation. This implementation provides a simple manner to determine the four signals with N/2 points.

According to a second aspect, a signal transmission method is provided. The signal transmission method may be performed by a receiver, or a chip or a circuit disposed in a receiver. This is not limited in this application.

It should be noted that a device for receiving a signal in this application may be referred to as a receiver, a receive end, a receiving device, or a second device. A name of the receive end is not limited in this application, and the receive end may be referred to as a receiver below for ease of description.

The signal transmission method includes:
obtaining an eighth signal with 3N/2 points, where the eighth signal with 3N/2 points includes three signals of an eleventh signal with N/2 points, a twelfth signal with N/2 points, a thirteenth signal with N/2 points, and a fourteenth signal with N/2 points; determining a signal in the eleventh signal with N/2 points, the twelfth signal with N/2 points, the thirteenth signal with N/2 points, and the fourteenth signal with N/2 points other than the three signals included in the eighth signal; and determining a first signal with N points based on the eleventh signal with N/2 points, the twelfth signal with N/2 points, the thirteenth signal with N/2 points, and the fourteenth signal with N/2 points, where N is a positive even number.

In the signal transmission method provided in this application, the receiver side can restore, based on the received signal with 3N/2 points, the first signal with N points that needs to be sent to the receiver side by a transmitter side. This can improve spectral efficiency of signal transmission without increasing power consumption while ensuring that a baseband signal of a to-be-sent signal (for example, an OFDM signal) is a non-negative real number.

With reference to the second aspect, in some implementations of the second aspect, the determining a first signal with N points based on the eleventh signal with N/2 points, the twelfth signal with N/2 points, the thirteenth signal with N/2 points, and the fourteenth signal with N/2 points includes: determining a fifteenth signal with N points based on the eleventh signal with N/2 points, the twelfth signal with N/2 points, the thirteenth signal with N/2 points, and the fourteenth signal with N/2 points; and performing IFFT or FFT on the fifteenth signal with N points, to obtain the first signal with N points.

Specifically, the receiver may determine, based on the received signal with 3N/2 points, a signal with N/2 points that is not received in the four signals with N/2 points, and further restore the first signal with N points based on the four signals with N/2 points. This application provides different combination manners to obtain the signal with 3N/2 points. This can improve flexibility of the solution.

With reference to the second aspect, in some implementations of the second aspect, the determining a fifteenth signal with N points based on the eleventh signal with N/2 points, the twelfth signal with N/2 points, the thirteenth signal with N/2 points, and the fourteenth signal with N/2 points includes: determining a signal with first N/2 points of the fifteenth signal with N points based on a difference between a signal at a location corresponding to the eleventh signal with N/2 points and a signal at a location corresponding to the fourteenth signal with N/2 points; and determining a signal with last N/2 points of the fifteenth signal with N points based on a difference between a signal at a location corresponding to the thirteenth signal with N/2 points and a signal at a location corresponding to the twelfth signal with N/2 points.

In a possible implementation, the fifteenth signal with N points may be determined based on the difference between the four signals with N/2 points. This implementation provides a simple manner to determine the fifteenth signal with N points.

With reference to the second aspect, in some implementations of the second aspect, the eighth signal with 3N/2 points includes either the eleventh signal with N/2 points or the twelfth signal with N/2 points, the thirteenth signal with N/2 points, and the fourteenth signal with N/2 points; or the eighth signal with 3N/2 points includes either the thirteenth signal with N/2 points or the fourteenth signal with N/2 points, the eleventh signal with N/2 points, and the twelfth signal with N/2 points. A signal with N/2 points included in the eleventh signal with N/2 points is obtained by summing up a signal at a location corresponding to a fourth signal with N/2 points and a signal at a location corresponding to a sixth signal with N/2 points, a signal with N/2 points included in the twelfth signal with N/2 points is obtained by summing up the signal at the location corresponding to the fourth signal with N/2 points and a signal at a location corresponding to a seventh signal with N/2 points, a signal with N/2 points included in the thirteenth signal with N/2 points is obtained by summing up a signal at a location corresponding to a fifth signal with N/2 points and the signal at the location corresponding to the sixth signal with N/2 points, and a signal with N/2 points included in the fourteenth signal with N/2 points is obtained by summing up the signal at the location corresponding to the fifth signal with N/2 points and the signal at the location corresponding to the seventh signal with N/2 points.

In a possible implementation, the four signals with N/2 points may be determined by summing up the signals obtained after FFT or IFFT is performed on the two groups of signals obtained through separation. This implementation provides a simple manner to determine the four signals with N/2 points.

With reference to the second aspect, in some implementations of the second aspect, when the eighth signal with 3N/2 points includes either the eleventh signal with N/2 points or the twelfth signal with N/2 points, the thirteenth signal with N/2 points, and the fourteenth signal with N/2 points, the determining a signal in the eleventh signal with N/2 points, the twelfth signal with N/2 points, the thirteenth signal with N/2 points, and the fourteenth signal with N/2 points other than the three signals included in the eighth signal includes: determining that a signal is the eleventh signal with N/2 points or the twelfth signal with N/2 points. When the eighth signal with 3N/2 points includes either the thirteenth signal with N/2 points or the fourteenth signal with N/2 points, the eleventh signal with N/2 points, and the twelfth signal with N/2 points, the determining a signal in the eleventh signal with N/2 points, the twelfth signal with N/2 points, the thirteenth signal with N/2 points, and the fourteenth signal with N/2 points other than the three signals included in the eighth signal includes: determining that a signal is the thirteenth signal with N/2 points or the fourteenth signal with N/2 points.

With reference to the second aspect, in some implementations of the second aspect, the determining that a signal is the eleventh signal with N/2 points or the twelfth signal with N/2 points includes: adding the signal at the location corresponding to the twelfth signal to the signal at the location corresponding to the thirteenth signal and subtracting the signal at the location corresponding to the fourteenth signal, to obtain the eleventh signal; or adding the signal at the location corresponding to the eleventh signal to the signal at the location corresponding to the fourteenth signal and subtracting the signal at the location corresponding to the thirteenth signal, to obtain the twelfth signal.

With reference to the second aspect, in some implementations of the second aspect, the determining that a signal is the thirteenth signal with N/2 points or the fourteenth signal with N/2 points includes: adding the signal at the location corresponding to the eleventh signal to the signal at the location corresponding to the fourteenth signal and subtracting the signal at the location corresponding to the twelfth signal, to obtain the thirteenth signal; or adding the signal at the location corresponding to the twelfth signal to the signal at the location corresponding to the thirteenth signal and subtracting the signal at the location corresponding to the eleventh signal, to obtain the fourteenth signal.

According to a third aspect, a signal transmission apparatus is provided. The signal transmission apparatus includes a processor, configured to implement a function of the transmitter in the method described in the first aspect.

Optionally, the signal transmission apparatus may further include a memory. The memory is coupled to the processor, and the processor is configured to implement the function of the transmitter in the method described in the first aspect.

In a possible implementation, the memory is configured to store program instructions and data. The memory is coupled to the processor. The processor may invoke and execute the program instructions stored in the memory, to implement the function of the transmitter in the method described in the first aspect.

Optionally, the signal transmission apparatus may further include a communication interface. The communication interface is for communication between the signal transmission apparatus for and another device. When the signal transmission apparatus is a transmitter, the transceiver may be a communication interface or an input/output interface.

In a possible design, the signal transmission apparatus includes a processor and a communication interface, configured to implement the function of the transmitter in the method described in the first aspect, and specifically includes: The processor communicates with an external device through the communication interface. The processor is configured to run a computer program, to enable the apparatus to implement any method described in the first aspect.

It may be understood that the external device may be an object other than the processor, or an object other than the apparatus.

In another implementation, when the signal transmission apparatus is a chip or a chip system, the communication interface may be an input/output interface, an interface circuit, an output circuit, an input circuit, a pin, a related circuit, or the like in the chip or the chip system. The processor may alternatively be embodied as a processing circuit or a logic circuit.

According to a fourth aspect, a signal transmission apparatus is provided. The signal transmission apparatus includes a processor, configured to implement a function of the receiver in the method described in the second aspect.

Optionally, the signal transmission apparatus may further include a memory. The memory is coupled to the processor, and the processor is configured to implement the function of the receiver in the method described in the second aspect.

In a possible implementation, the memory is configured to store program instructions and data. The memory is coupled to the processor. The processor may invoke and execute the program instructions stored in the memory, to implement the function of the receiver in the method described in the second aspect.

Optionally, the signal transmission apparatus may further include a communication interface. The communication interface is for communication between the signal transmission apparatus for and another device. When the signal transmission apparatus is a receiver, the transceiver may be a communication interface or an input/output interface.

In a possible design, the signal transmission apparatus includes a processor and a communication interface, configured to implement the function of the receiver in the method described in the second aspect, and specifically includes: The processor communicates with an external device through the communication interface. The processor is configured to run a computer program, to enable the apparatus to implement any method described in the second aspect.

It may be understood that the external device may be an object other than the processor, or an object other than the apparatus.

In another implementation, when the signal transmission apparatus is a chip or a chip system, the communication interface may be an input/output interface, an interface circuit, an output circuit, an input circuit, a pin, a related circuit, or the like in the chip or the chip system. The processor may alternatively be embodied as a processing circuit or a logic circuit.

According to a fifth aspect, a computer-readable storage medium is provided, and stores a computer program or instructions. When the computer program or the instructions is/are run on a computer, the method in any one of the first aspect and possible implementations of the first aspect is performed.

According to a sixth aspect, a computer-readable storage medium is provided, and stores a computer program or instructions. When the computer program or the instructions is/are run on a computer, the method in any one of the second aspect and possible implementations of the second aspect is performed.

According to a seventh aspect, a computer program product including instructions is provided. When the instructions are run on a computer, the method in any one of the first aspect and possible implementations of the first aspect is performed.

According to an eighth aspect, a computer program product including instructions is provided. When the instructions are run on a computer, the method in any one of the second aspect and possible implementations of the second aspect is performed.

According to a ninth aspect, an optical signal transmission device is provided, and includes the signal transmission apparatus in the third aspect and the signal transmission apparatus in the fourth aspect.

According to a tenth aspect, a signal transmission apparatus is provided, including: an input interface (circuit), configured to obtain a first signal with N points, where N is a positive even number;
  a logic circuit, configured to determine a second signal with N points and a third signal with N points based on the first signal with N points, where the second signal with N points is used to determine a fourth signal with N/2 points and a fifth signal with N/2 points, and the third signal with N points is used to determine a sixth signal with N/2 points and a seventh signal with N/2 points, where the logic circuit is further configured to determine an eighth signal with 3N/2 points based on the fourth signal with N/2 points, the fifth signal with N/2 points, the sixth signal with N/2 points, and the seventh signal with N/2 points; and
  an output interface (circuit), configured to send the eighth signal with 3N/2 points.

The second signal with N points is obtained by setting a signal at an even location in the first signal with N points to 0, and the third signal with N points is obtained by setting a signal at an odd location in the first signal with N points to 0.

With reference to the tenth aspect, in some implementations of the tenth aspect, the logic circuit is further configured to perform inverse fast Fourier transform IFFT or fast Fourier transform FFT on the second signal with N points, to obtain a ninth signal with N points.

The fourth signal with N/2 points includes negative parts, that are set to 0, of the first N/2 points of the ninth signal with N points and positive parts of the first N/2 points of the ninth signal with N points, or positive parts, that are set to 0, of the last N/2 points of the ninth signal with N points and an absolute value of negative parts of the last N/2 points of the ninth signal with N points.

The fifth signal with N/2 points includes the positive parts, that are set to 0, of the first N/2 points of the ninth signal with N points and an absolute value of the negative parts of the first N/2 points of the ninth signal with N points, or the negative parts, that are set to 0, of the last N/2 points of the ninth signal with N points and the positive parts of the last N/2 points of the ninth signal with N points.

With reference to the tenth aspect, in some implementations of the tenth aspect, the logic circuit is further configured to perform IFFT or FFT on the third signal with N points, to obtain a tenth signal with N points.

The sixth signal with N/2 points includes negative parts, that are set to 0, of the first N/2 points or last N/2 points of the tenth signal with N points and positive parts of the first N/2 points or last N/2 points of the tenth signal with N points.

The seventh signal with N/2 points includes the positive parts, that are set to 0, of the first N/2 points or last N/2 points of the tenth signal with N points and an absolute value of the negative parts of the first N/2 points or last N/2 points of the tenth signal with N points.

With reference to the tenth aspect, in some implementations of the tenth aspect, that the logic circuit is configured to determine an eighth signal with 3N/2 points based on the fourth signal with N/2 points, the fifth signal with N/2 points, the sixth signal with N/2 points, and the seventh signal with N/2 points includes:

The logic circuit is specifically configured to determine at least three of an eleventh signal with N/2 points, a twelfth signal with N/2 points, a thirteenth signal with N/2 points, and a fourteenth signal with N/2 points.

The eleventh signal with N/2 points is determined based on the fourth signal with N/2 points and the sixth signal with N/2 points.

The twelfth signal with N/2 points is determined based on the fourth signal with N/2 points and the seventh signal with N/2 points.

The thirteenth signal with N/2 points is determined based on the fifth signal with N/2 points and the sixth signal with N/2 points.

The fourteenth signal with N/2 points is determined based on the fifth signal with N/2 points and the seventh signal with N/2 points.

The eighth signal with 3N/2 points includes either the eleventh signal with N/2 points or the twelfth signal with N/2 points, the thirteenth signal with N/2 points, and the fourteenth signal with N/2 points; or the eighth signal with 3N/2 points includes either the thirteenth signal with N/2 points or the fourteenth signal with N/2 points, the eleventh signal with N/2 points, and the twelfth signal with N/2 points.

According to an eleventh aspect, a signal transmission apparatus is provided, including:

an input interface (circuit), configured to obtain an eighth signal with 3N/2 points, where the eighth signal with 3N/2 points includes three signals of an eleventh signal with N/2 points, a twelfth signal with N/2 points, a thirteenth signal with N/2 points, and a fourteenth signal with N/2 points; and a logic circuit, configured to determine a signal in the eleventh signal with N/2 points, the twelfth signal with N/2 points, the thirteenth signal with N/2 points, and the fourteenth signal with N/2 points other than the three signals included in the eighth signal.

the logic circuit is further configured to determine a first signal with N points based on the eleventh signal with N/2 points, the twelfth signal with N/2 points, the thirteenth signal with N/2 points, and the fourteenth signal with N/2 points, where N is a positive even number.

With reference to the eleventh aspect, in some implementations of the eleventh aspect, that the logic circuit determines a first signal with N points based on the eleventh signal with N/2 points, the twelfth signal with N/2 points, the thirteenth signal with N/2 points, and the fourteenth signal with N/2 points includes:

the logic circuit is specifically configured to:

determine a fifteenth signal with N points based on the eleventh signal with N/2 points, the twelfth signal with N/2 points, the thirteenth signal with N/2 points, and the fourteenth signal with N/2 points; and perform IFFT or FFT on the fifteenth signal with N points, to obtain the first signal with N points.

With reference to the eleventh aspect, in some implementations of the eleventh aspect, that the logic circuit is configured to determine a fifteenth signal with N points based on the eleventh signal with N/2 points, the twelfth signal with N/2 points, the thirteenth signal with N/2 points, and the fourteenth signal with N/2 points includes:

the logic circuit is configured to determine a signal with first N/2 points of the fifteenth signal with N points based on a difference between a signal at a location corresponding to the eleventh signal with N/2 points and a signal at a location corresponding to the fourteenth signal with N/2 points.

The logic circuit is further configured to determine a signal with last N/2 points of the fifteenth signal with N points based on a difference between a signal at a location corresponding to the thirteenth signal with N/2 points and a signal at a location corresponding to the twelfth signal with N/2 points.

With reference to the eleventh aspect, in some implementations of the eleventh aspect, when the eighth signal with 3N/2 points includes either the eleventh signal with N/2 points or the twelfth signal with N/2 points, the thirteenth signal with N/2 points, and the fourteenth signal with N/2 points, the logic circuit is further configured to determine that the signal is the eleventh signal with N/2 points or the twelfth signal with N/2 points.

When the eighth signal with 3N/2 points includes either the thirteenth signal with N/2 points or the fourteenth signal with N/2 points, the eleventh signal with N/2 points, and the twelfth signal with N/2 points, the logic circuit is further configured to determine that the signal is the thirteenth signal with N/2 points or the fourteenth signal with N/2 points.

With reference to the eleventh aspect, in some implementations of the eleventh aspect, that the logic circuit is further configured to determine that the signal is the eleventh signal with N/2 points or the twelfth signal with N/2 points includes:

the logic circuit adds the signal at the location corresponding to the twelfth signal to the signal at the location corresponding to the thirteenth signal and subtracts the signal at the location corresponding to the fourteenth signal, to obtain the eleventh signal; or adds the signal at the location corresponding to the eleventh signal to the signal at the location corresponding to the fourteenth signal and subtracts the signal at the location corresponding to the thirteenth signal, to obtain the twelfth signal.

That the logic circuit is further configured to determine that the signal is the thirteenth signal with N/2 points or the fourteenth signal with N/2 points includes:

p the logic circuit adds the signal at the location corresponding to the eleventh signal to the signal at the location corresponding to the fourteenth signal and subtracts the signal at the location corresponding to the twelfth signal, to obtain the thirteenth signal; or adds the signal at the location corresponding to the twelfth signal to the signal at the location corresponding to the thirteenth signal and subtracts the signal at the location corresponding to the eleventh signal, to obtain the fourteenth signal.

According to a twelfth aspect, an optical signal transmission device is provided, and includes the signal transmission apparatus in the tenth aspect and the signal transmission apparatus in the eleventh aspect.

Figure 10:
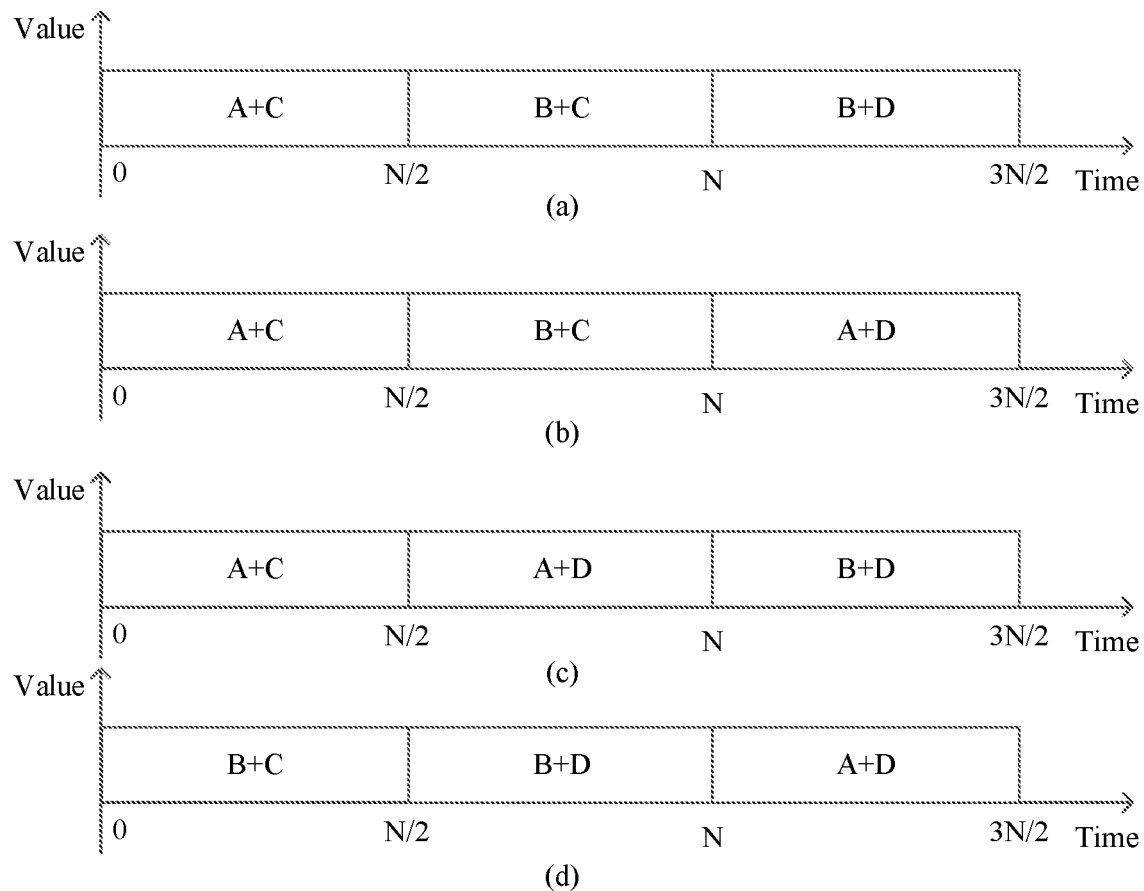
Figure 11:
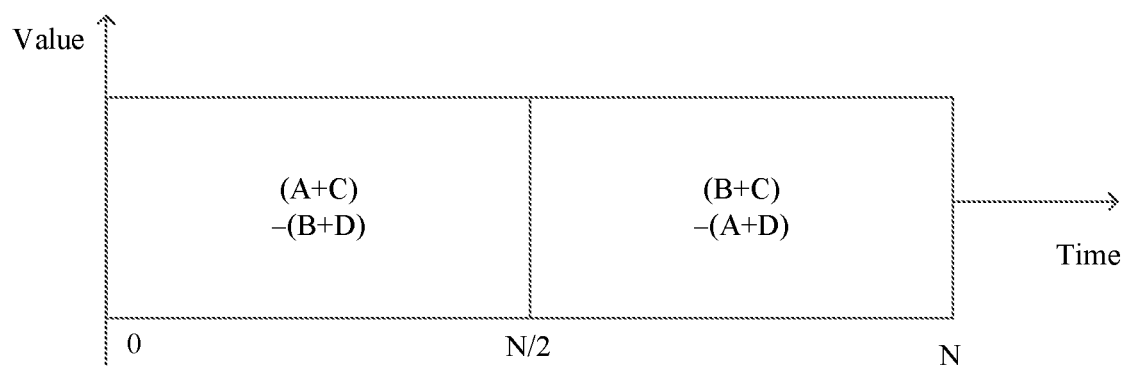
Figure 12:
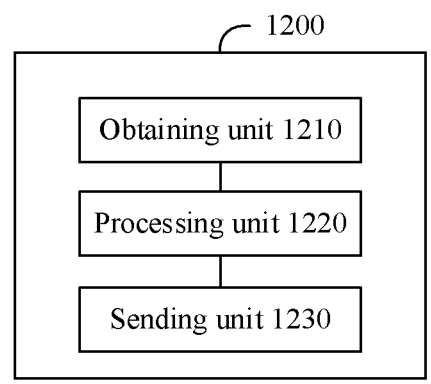
Figure 13:
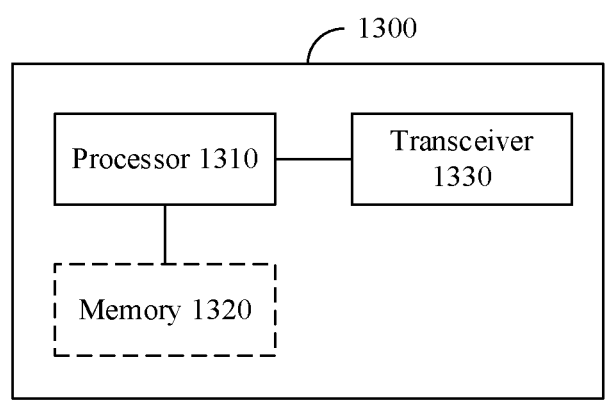
Figure 14:
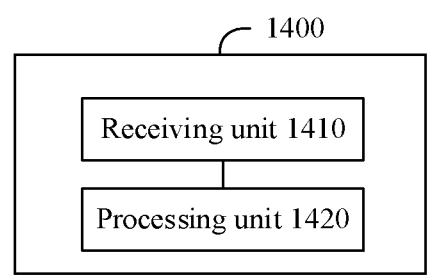
Figure 15:
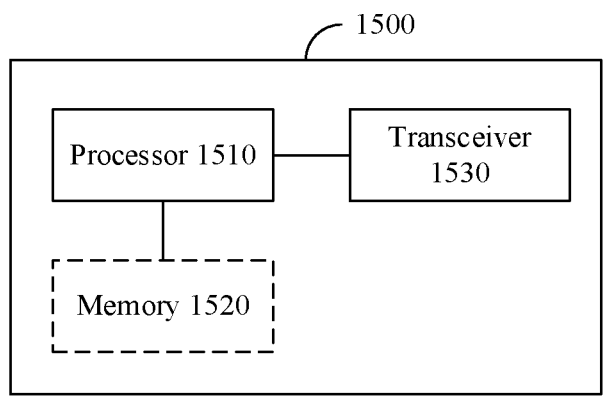

(a) to (d) in FIG. 10 are schematic diagrams of an air interface signal according to an embodiment of this application;

FIG. 11 is a schematic diagram of a signal after demixing according to an embodiment of this application;

FIG. 12 is a schematic diagram of a signal transmission apparatus 1200 according to this application;

FIG. 13 is a schematic diagram of a structure of a transmitter 1300 applicable to an embodiment of this application;

FIG. 14 is a schematic diagram of a signal transmission apparatus 1400 according to this application; and FIG. 15 is a schematic diagram of a structure of a receiver 1500 applicable to an embodiment of this application.

DETAILED DESCRIPTION OF ILLUSTRATIVE EMBODIMENTS

The following describes technical solutions of this application with reference to the accompanying drawings.

Terms used in the following embodiments are merely intended to describe specific embodiments, but are not intended to limit this application. As used in the specification and appended claims of this application, singular expressions "one", "a", "the", "the foregoing", "this", and "the one" are also intended to include expressions such as "one or more", unless otherwise specified in the context clearly. It should further be understood that in the following embodiments of this application, "at least one" and "one or more" mean one, two, or more.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. Terms "include", "have", and their variants all mean "include but are not limited to", unless otherwise specifically emphasized.

Figure 1:
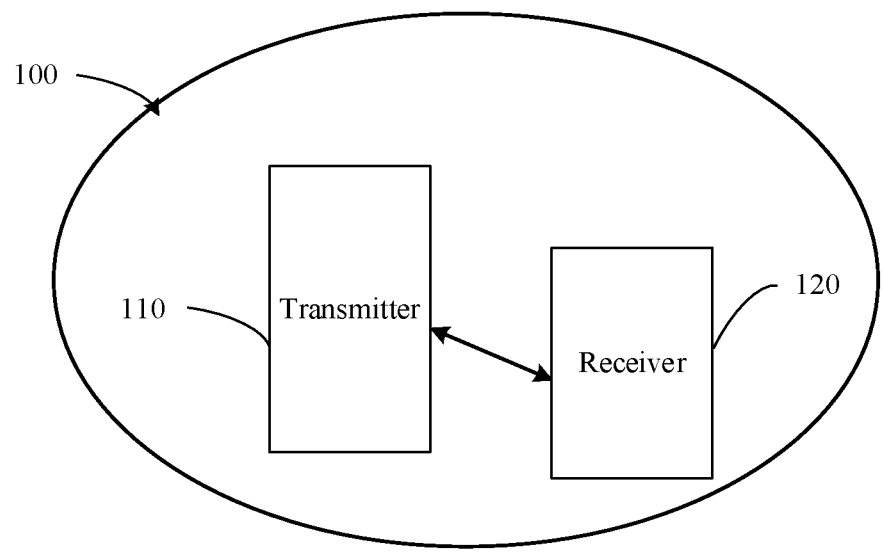
FIG. 1 is a schematic diagram of a signal transmission system 100 applicable to a signal transmission method according to an embodiment of this application.

To better understand embodiments of this application, the following describes a signal transmission system applicable to embodiments of this application by using a signal transmission system shown in FIG. 1 as an example. FIG. 1 is a schematic diagram of a signal transmission system 100 applicable to a signal transmission method according to an embodiment of this application.

As shown in FIG. 1, the signal transmission system 100 may include at least one transmitter, for example, a transmitter no shown in FIG. 1. The signal transmission system 100 may further include at least one receiver, for example, a receiver 120 shown in FIG. 1. The transmitter no may communicate with the receiver 120 by using a wireless link or a wired link (for example, an optical fiber or an optical cable).

A plurality of wireless links may be configured for each device, for example, the transmitter no or the receiver 120. For the transmitter no in the signal transmission system 100, the plurality of configured wireless links may include at least one transmit wireless link used to send an optical signal. For the receiver 120 in the optical signal transmission system 100, the plurality of configured wireless links may include at least one receive wireless link used to receive an optical signal.

The transmitter and the receiver in this application may be various terminal devices, for example, user equipment (UE), an access terminal, a subscriber unit, a subscriber station, a mobile console, a mobile station, a remote station, a remote terminal, a mobile device, terminal equipment (TE), a terminal, a wireless communication device, a user agent or a user apparatus, a tablet computer (pad), a handheld device with a wireless communication function, a computing device or another processing device connected to a wireless modem, a vehicle-mounted device, a vehicle-mounted communication module, a wearable device, a terminal device in a 5th generation communication 5G network or a network after 5G, a terminal and a car in intelligent transportation, a home device in smart home, an electric meter reading instrument in a smart grid, a voltage monitoring instrument, an environmental monitoring instrument, a video surveillance instrument in an intelligent security network, a cash register, a machine type communication (MTC) terminal, a laser communication transceiver, an LED optical communication transceiver, a wired optical fiber communication transceiver, an optical module, or the like. This is not limited in this application.

Alternatively, the transmitter and the receiver in this application may be various network devices or access devices in a communication system, that is, devices configured to communicate with a terminal device. For example, the transmitter and the receiver may be an evolved NodeB (eNB or eNodeB) in a long term evolution (LTE) system, a next generation NodeB (gNB) in a 5G system, a transmission reception point (TRP), a relay node, an access point (AP), a macro base station, a micro base station, an indoor AP node, or the like. This is not limited in this application.

It should be understood that FIG. 1 is merely a simplified schematic diagram used as an example for ease of understanding. The signal transmission system wo may further include another transmitter or another receiver that is not shown in FIG. 1.

To facilitate understanding of embodiments of this application, the following describes some basic concepts in embodiments of this application.

1. Hermitian Symmetry Constraint

A process of generating an OFDM signal carried on an optical signal for transmission mainly includes:

First, N frequency domain signals are generated, and then N time domain signals are generated through inverse fast Fourier transform (IFFT), where N is a positive integer.

In optical communication, the N time domain signals of the OFDM signal need to be non-negative real numbers. Specifically, the non-negative real numbers may be divided into two parts: (1) real number; and (2) non-negative number.

To meet a requirement that the time domain signal is a real number, the N frequency domain signals of the OFDM signal need to meet a Hermitian symmetry (HS) constraint:

$$X_m = X_{N-m}^* \quad 0 < m < \frac{N}{2}$$

$$X_0 = X_{\frac{N}{2}}$$

$X_m$ is a frequency domain signal whose index value is m in the N frequency domain signals, $X_{N-m}^*$ is a conjugate value of a frequency domain signal whose index value is N-m in the N frequency domain signals, and $$X_{\frac{N}{2}}$$

is a frequency domain signal whose index value is N/2 in the N frequency domain signals.

The HS constraint is widely applied to the field of optical communication, to ensure that a time domain signal of an OFDM signal is a real number. However, the HS constraint cannot ensure that the N time domain signals of the OFDM signal are non-negative numbers.

To further meet a requirement that the N time domain signals of the OFDM signal are non-negative numbers, there are different methods in the field of optical communication, for example, a direct-current-biased optical orthogonal frequency division multiplexing (DCO-OFDM) method, an asymmetrically-clipped optical orthogonal frequency division multiplexing (ACO-OFDM) method, and a unipolar orthogonal frequency division multiplexing (U-OFDM) method.

The following describes the methods for ensuring that the N time domain signals of the OFDM signal are non-negative numbers.

2. Direct-current-biased optical orthogonal frequency division multiplexing method In the DCO-OFDM method, a direct current bias is added to the time domain signal of the OFDM signal, to ensure that the time domain signal of the OFDM signal is a non-negative number.

Figure 2:
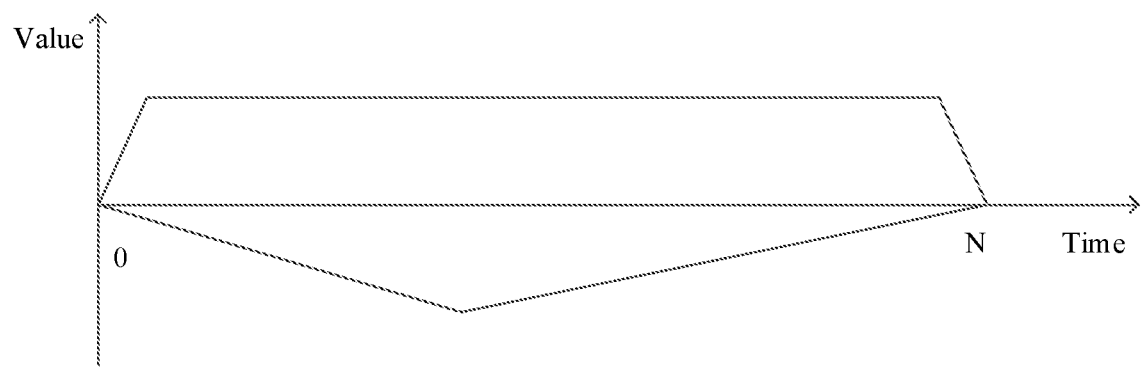
FIG. 2 is a schematic diagram of a time domain signal of an OFDM signal that meets an HS constraint.

Specifically, as shown in FIG. 2, when the N frequency domain signals (for example, X(0), X(1), . . . , X(N-1)) of the OFDM signal meet the HS constraint, the N time domain signals (for example, x(0), x(1), . . . , x(N-1)) of the OFDM signal are real numbers. FIG. 2 is a schematic diagram of a time domain signal of an OFDM signal that meets an HS constraint.

Figure 3:
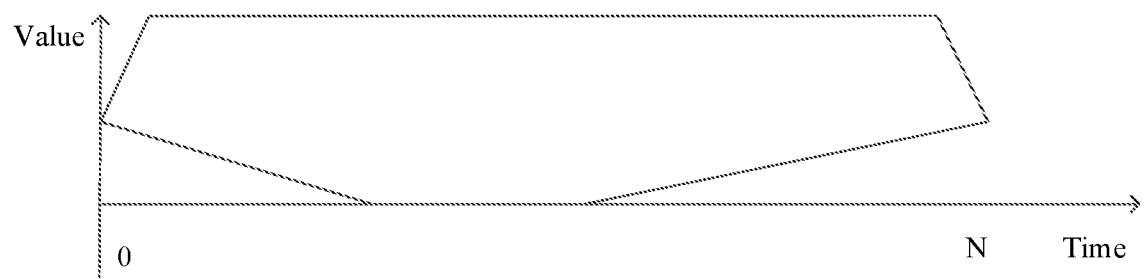
FIG. 3 is a schematic diagram of a time domain signal of an OFDM signal based on a DCO-OFDM method.

FIG. 3 is a schematic diagram of a time domain signal of an OFDM signal based on a DCO-OFDM method.

Because the HS constraint is met, when the OFDM signal is transmitted by using the DCO-OFDM method, spectral efficiency is ½, and a direct current bias is required. As a result, power consumption of signal transmission is increased.

3. Asymmetrically-clipped optical orthogonal frequency division multiplexing method In the ACO-OFDM method, a frequency domain signal at an even sub-carrier of the OFDM signal is set to 0, so that the time domain signal of the OFDM signal meets symmetry. Further, based on symmetry, a negative time domain signal is directly set to 0.

Specifically, as shown in FIG. 3, when the N frequency domain signals (for example, X(0), X(1), . . . , X(N-1)) of the OFDM signal meet the HS constraint, the N time domain signals (for example, x(0), x(1), . . . , x(N-1)) of the OFDM signal are real numbers.

Figure 4:
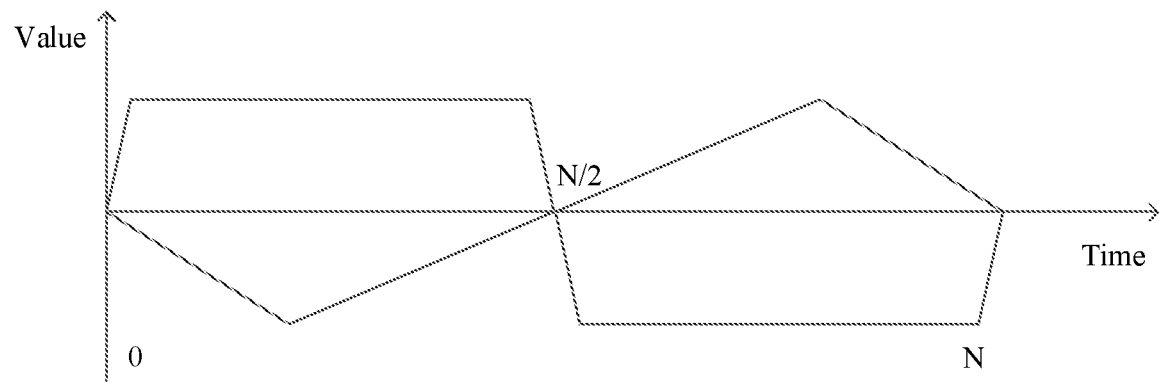
FIG. 4 is a schematic diagram of a time domain signal, that is set to 0, at an even location of an OFDM signal and that meets an HS constraint.

FIG. 4 is a schematic diagram of a time domain signal, that is set to 0, at an even location of an OFDM signal and that meets an HS constraint.

Figure 5:
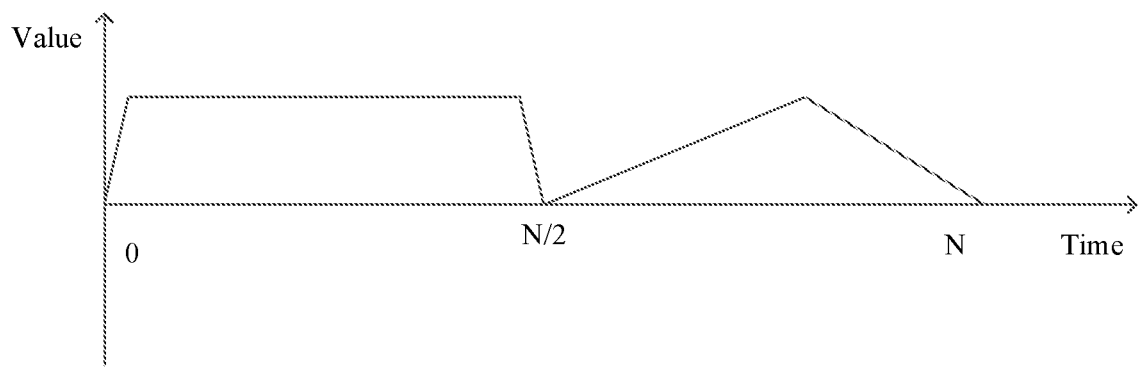
FIG. 5 is a schematic diagram of a time domain signal of an OFDM signal based on an ACO-OFDM method.

FIG. 5 is a schematic diagram of a time domain signal of an OFDM signal based on an ACO-OFDM method.

Due to symmetry, original signal information is not lost. In comparison with the DCO-OFDM method, because a frequency domain signal at an even location of an OFDM signal is set to 0, spectral efficiency is ¼. However, because no direct current bias is required, power consumption is reduced at the expense of half of spectral efficiency.

4. Unipolar Orthogonal Frequency Division Multiplexing Method

In the U-OFDM method, a negative part of a time domain signal of an OFDM signal is reversed and then placed at the end of the time domain signal of the OFDM signal for transmission.

Specifically, as shown in FIG. 3, when the N frequency domain signals (for example, X(0), X(1), . . . , X(N-1)) of the OFDM signal meet the HS constraint, the N time domain signals (for example, x(0), x(1), . . . , x(N-1)) of the OFDM signal are real numbers.

Figure 6:
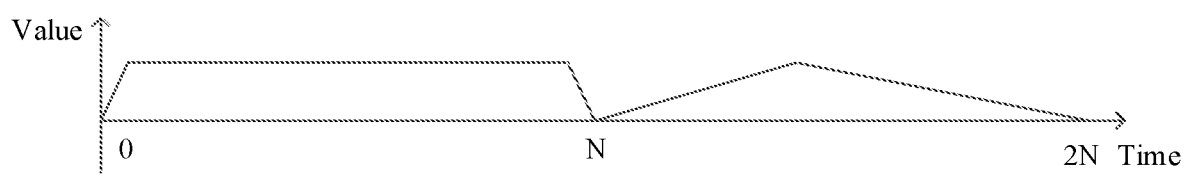
FIG. 6 is a schematic diagram of a time domain signal of an OFDM signal based on a U-OFDM method.

FIG. 6 is a schematic diagram of a time domain signal of an OFDM signal based on a U-OFDM method.

Compared with the DCO-OFDM method, the U-OFDM method doubles time with spectral efficiency of ¼. In other words, half of time efficiency is decreased, which is equivalent to decreasing half of spectral efficiency. However, because no direct current bias is required, power consumption is reduced.

As described above, a signal transmitted in the visible light field needs to be a non-negative real number. To meet this requirement, in the DCO-OFDM method, signal transmission is implemented by using a direct current bias, and spectral efficiency is ½. However, because the direct current bias is required, power consumption is increased. In the ACO-OFDM method and the U-OFDM method, although a direct current bias is not required and power consumption is reduced, spectral efficiency is ¼. In other words, the several methods for ensuring that the N time domain signals of the OFDM signal are non-negative real numbers have disadvantages of high power consumption and/or low spectral efficiency. To improve spectral efficiency without increasing power consumption while ensuring that a baseband signal of an OFDM signal is a non-negative real number, this application provides a signal transmission method. A new air interface signal transmission waveform is designed without a direct current bias, to improve spectral efficiency.

In addition, the following descriptions are provided to facilitate understanding of embodiments of this application.

First, in this application, "indicate" may include "directly indicate" and "indirectly indicate". When a piece of indication information is described as indicating A, the indication information may directly indicate A or indirectly indicate A, but it does not necessarily mean that the indication information includes A.

If information indicated by the indication information is referred to as to-be-indicated information, in a specific implementation process, there are many manners of indicating the to-be-indicated information. For example, but not limited to, the to-be-indicated information may be directly indicated, for example, the to-be-indicated information or an index of the to-be-indicated information. The to-be-indicated information may alternatively be indirectly indicated by indicating other information, where there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may further be identified and indicated in a unified manner, to reduce indication overheads caused by separately indicating same information.

Second, "first", "second", and various numerical numbers (for example, "1" and "2") in this application are merely used to distinguish between objects for ease of description, but are not intended to limit the scope of embodiments of this application. For example, different signals are distinguished.

Third, in this application, "preset" may include "indicated by a transmit by using signaling" or "predefined", for example, "defined in a protocol". "Pre-definition" may be implemented by prestoring corresponding code or a corresponding table in a device (for example, including a transmitter or a receiver), or in another manner that may be used to indicate related information. A specific implementation is not limited in this application.

Fourth, "storage" in embodiments of this application may be stored in one or more memories. The one or more memories may be separately disposed, or may be integrated into an encoder, a translator, a processor, or a communication apparatus. Alternatively, a part of the one or more memories may be separately disposed, and a part of the one or more memories are integrated into the translator, the processor, or the communication apparatus. A type of the memory may be a storage medium in any form, and this is not limited in this application.

The following describes in detail the signal transmission method provided in embodiments of this application with reference to the accompanying drawings.

It should be understood that the signal transmission method provided in embodiments of this application may be applied to the signal transmission system 100 shown in FIG. 1. The signal transmission system may include at least one transmitter and at least one receiver. The transmitter may communicate with the receiver by using an optical fiber.

It should further be understood that a specific structure of an entity for performing the method provided in embodiments of this application is not specially limited in the following embodiments, provided that a program that records code for the method provided in embodiments of this application can be run to perform communication according to the method provided in embodiments of this application. For example, the method provided in embodiments of this application may be performed by a transmitter and a receiver, or a functional module in the transmitter and the receiver that can execute the program.

Without loss of generality, the following describes in detail the signal transmission method provided in embodiments of this application by using interaction between the transmitter and the receiver as an example.

Figure 7:
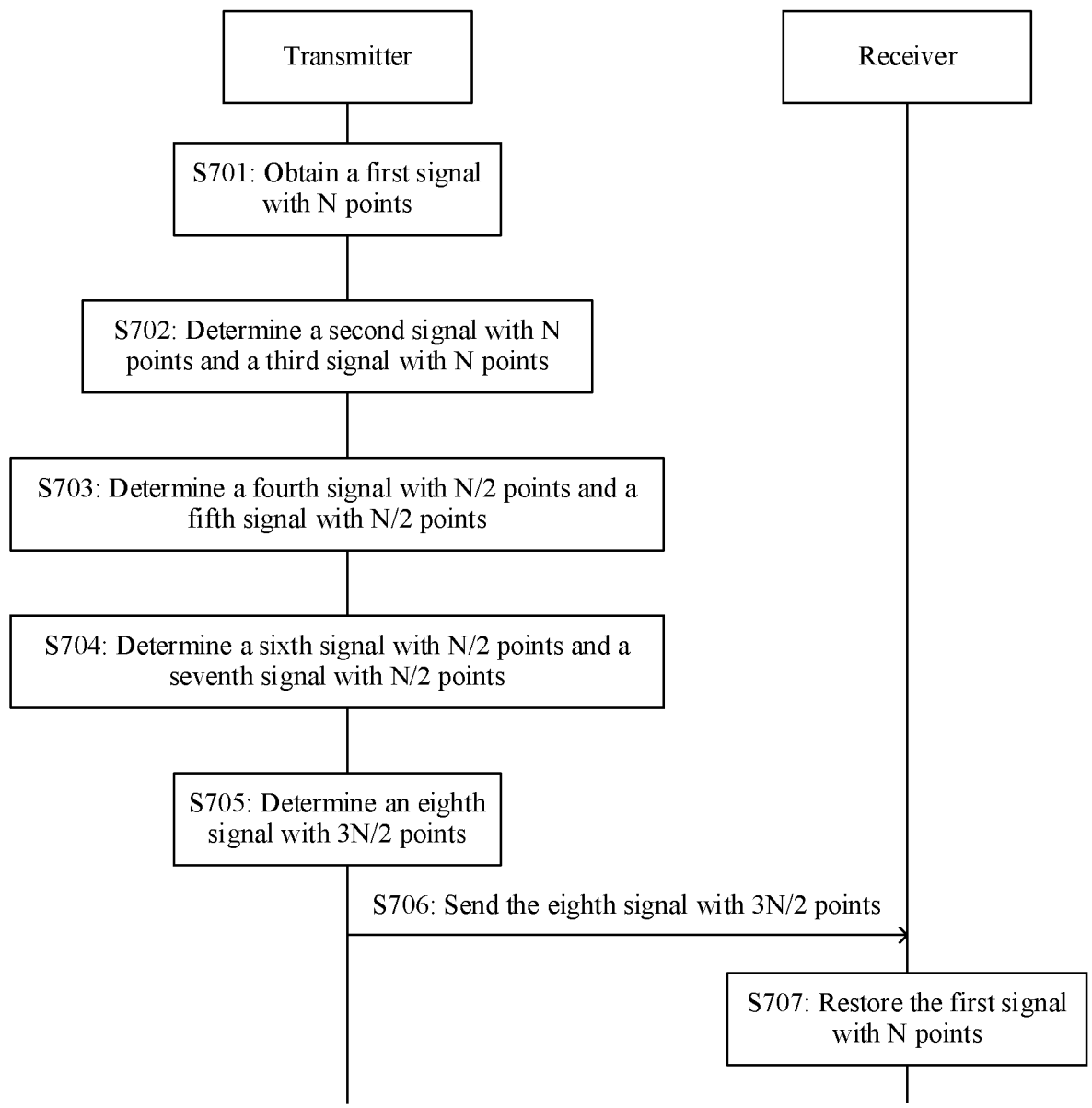
FIG. 7 is a schematic flowchart of a signal transmission method according to this application.

FIG. 7 is a schematic flowchart of a signal transmission method according to this application. The method is performed by a transmitter and a receiver.

In the signal transmission method, the transmitter side is mainly configured to:
(1) obtain a first signal with N points, where N is a positive even number;
(2) for the first signal with N points, perform odd and even index elements separation, to obtain a second signal with N points (a signal at an odd location) and a third signal with N points (a signal at an even location);
(3) perform IFFT or FFT on the second signal with N points obtained through separation, to obtain a ninth signal with N points, and perform IFFT or FFT on the third signal with N points obtained through separation, to obtain a tenth signal with N points;
(4) determine a fourth signal with N/2 points and a fifth signal with N/2 points based on the ninth signal with N points, and determine a sixth signal with N/2 points and a seventh signal with N/2 points based on the tenth signal with N points;
(5) mix the fourth signal with N/2 points, the fifth signal with N/2 points, the sixth signal with N/2 points, and the seventh signal with N/2 points, to obtain at least three of an eleventh signal with N/2 points, a twelfth signal with N/2 points, a thirteenth signal with N/2 points, and a fourteenth signal with N/2 points, where an eighth signal with 3N/2 points includes at least three of the eleventh signal with N/2 points, the twelfth signal with N/2 points, the thirteenth signal with N/2 points, and the fourteenth signal with N/2 points; and
(6) send the eighth signal with 3N/2 points to the receiver.

In the signal transmission method, the receiver side is mainly configured to:
(1) obtain the eighth signal with 3N/2 points;
(2) demix the eighth signal with 3N/2 points, to obtain the eleventh signal with N/2 points, the twelfth signal with N/2 points, the thirteenth signal with N/2 points, and the fourteenth signal with N/2 points;
(3) determine a fifteenth signal with N points based on the eleventh signal with N/2 points, the twelfth signal with N/2 points, the thirteenth signal with N/2 points, and the fourteenth signal with N/2 points; and
(4) perform IFFT or FFT on the fifteenth signal with N points, to obtain the first signal with N points.

The foregoing briefly describes steps performed by the transmitter and the receiver in embodiments of this application. The following describes in detail an execution manner of each step with reference to FIG. 7.

The signal transmission method at least includes some of the following steps.

S701: Obtain the first signal with N points.

Optionally, that the transmitter obtains the first signal with N points may be receiving a to-be-transmitted first signal with N points that is externally input.

Optionally, that the transmitter obtains the first signal with N points may be obtaining a signal by deleting at least one point from or adding a signal with at least one point to a to-be-transmitted signal with N1 points that is externally input.

For example, if the transmitter receives a to-be-transmitted signal with N1 points (N1 is a positive odd number) that is externally input, the transmitter may delete a signal with an odd point from the signal with N1 points, to obtain the first signal with N points; or add a signal with an odd point to the signal with N1 points, to obtain the first signal with N points.

For another example, if the transmitter receives a to-be-transmitted signal with N1 points (N1 is a positive even number) that is externally input, the transmitter may delete a signal with an even point from the signal with N1 points, to obtain the first signal with N points; or add a signal with an even point to the signal with N1 points, to obtain the first signal with N points.

It should be noted that, in this embodiment of this application, a location of a signal added or deleted by the transmitter is not limited, and a manner of adding or deleting a signal is not limited either.

Optionally, that the transmitter obtains the first signal with N points may be performing odd and even index elements separation on a received signal with 2N points, to obtain a first signal with N points at an odd location or at an even location.

Optionally, that the transmitter obtains the first signal with N points may be performing signal separation on a received signal with N2 points, to obtain one group of signals in a plurality of groups of signals.

It should be understood that the foregoing is merely an example for describing a manner of obtaining the first signal with N points, and does not constitute any limitation on the protection scope of this application. In this embodiment of this application, the transmitter may alternatively obtain the first signal with N points in another manner.

N is a positive even number. For ease of description, the following uses an example in which the first signal with N points is a to-be-transmitted first signal with N points that is externally input, and other steps performed by the transmitter after the first signal with N points is obtained are similar to steps performed by the transmitter after the to-be-transmitted first signal with N points that is externally input is received. Details are not described again in this application.

In a possible implementation, a first frequency domain signal with N points of an OFDM signal is input.

In another possible implementation, a first time domain signal with N points of an OFDM signal is input.

It should be noted that a specific type of the first signal with N points in this embodiment of this application is not limited. The first signal with N points may be an OFDM signal or another signal that is similar to an OFDM signal and that meets symmetry.

However, for ease of description, in this application, an example in which the input first signal with N points is a first frequency domain signal with N points of an OFDM signal is used for description. When the input first signal with N points is a first time domain signal with N points of an OFDM signal or another signal similar to an OFDM signal, a processing process is similar. Details are not described in this application.

For example, the first frequency domain signal with N points (for example, X(0), X(1), . . . , X(N-1)) of the OFDM signal is input to the transmitter.

S702: Determine the second signal with N points and the third signal with N points based on the input first signal with N points.

A signal with N points included in the second signal with N points is obtained by setting a signal at an even location in the first signal with N points to 0, and a signal with N points included in the third signal with N points is obtained by setting a signal at an odd location in the first signal with N points to 0.

For example, that a signal with N points included in the second signal with N points is obtained by setting a signal at an even location in the first signal with N points to 0 includes:

a signal with N points included in the second signal with N points includes a signal, that is set to 0, at an even location in the first signal with N points and a signal at an odd location.

For example, that a signal with N points included in the third signal with N points is obtained by setting a signal at an odd location in the first signal with N points to 0 includes:

a signal with N points included in the third signal with N points includes a signal, that is set to 0, at an odd location in the first signal with N points and a signal at an even location.

Specifically, the second signal with N points is used to determine the fourth signal with N/2 points and the fifth signal with N/2 points, and the third signal with N points is used to determine the sixth signal with N/2 points and the seventh signal with N/2 points. With reference to step S703 and step S704, the following describes in detail a manner of determining and obtaining the fourth signal with N/2 points, the fifth signal with N/2 points, the sixth signal with N/2 points, and the seventh signal with N/2 points. Details are not described herein.

Optionally, the second signal with N points may also be referred to as a signal with N points at an odd location, and the third signal with N points may also be referred to as a signal with N points at an even location.

For example, the second signal with N points and the third signal with N points are described by using an example in which the input first signal with N points is a first frequency domain signal with N points (for example, X(0), X(1), . . . , X(N-1)).

Odd and even index elements separation is performed on the first frequency domain signal with N points of the OFDM signal that is input to the transmitter, to obtain a frequency domain signal with N points at an odd location: 0, X(1), 0, X(3), . . . , 0, X(N-1). It may be understood as that, based on the frequency domain signal with N points of the OFDM signal, a frequency domain signal with N/2 points at an even location is set to 0, and a frequency domain signal with N/2 points at an odd location of the OFDM signal remains unchanged, to obtain the frequency domain signal with N points at an odd location.

Similarly, odd and even index elements separation is performed on the first frequency domain signal with N points of the OFDM signal that is input to the transmitter, to obtain a frequency domain signal with N points at an even location: X(0), 0, X(2), 0, . . . , X(N-2), 0. It may be understood as that, based on the frequency domain signal with N points of the OFDM signal, a frequency domain signal with N/2 points at an odd location is set to 0, and a frequency domain signal with N/2 points at an even location of the OFDM signal remains unchanged, to obtain the frequency domain signal with N points at an even location.

Further, for ease of understanding, the following uses a specific example to describe how to obtain the frequency domain signal with N points at an odd location and the frequency domain signal with N points at an even location based on the input first frequency domain signal with N points of the OFDM signal.

For example, as shown in Table 1, a frequency domain signal with eight points (for example, X(0), X(1), . . . , X(N-1)) of the OFDM signal is input to the transmitter.

TABLE 1

| First signal with N points, where N = 8 | | | | | | | |
| --- | --- | --- | --- | --- | --- | --- | --- |
| 0 | −3 − j | −3 + j | −1 + 3j | 0 | −1 − 3j | −3 − j | −3 + j |

As shown in Table 2, after odd and even index elements separation, a frequency domain signal with eight points at an odd location is 0, X(1), 0, X(3), . . . , 0, X(N-1).

TABLE 2

| Second signal with N points, where N = 8 | | | | | | | |
| --- | --- | --- | --- | --- | --- | --- | --- |
| 0 | −3 − j | 0 | −1 + 3j | 0 | −1 − 3j | 0 | −3 + j |

As shown in Table 3, after odd and even index elements separation, a frequency domain signal with eight points at an even location is X(0), 0, X(2), 0, . . . , X(N-2), 0.

TABLE 3

| Third signal with N points, where N = 8 | | | | | | | |
|---|---|---|---|---|---|---|---|
| 0 | 0 | −3 + j | 0 | 0 | 0 | −3 − j | 0 |

S703: Determine the fourth signal with N/2 points and the fifth signal with N/2 points based on the second signal with N points.

Figure 8:
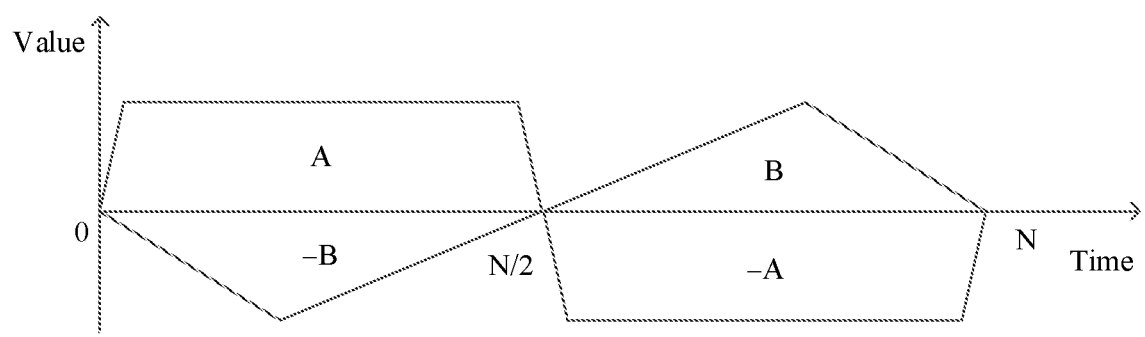
FIG. 8 is a schematic diagram of a time domain signal of an OFDM signal that is of a frequency domain signal with N points at an odd location and that meets an HS constraint according to an embodiment of this application.

In a possible implementation, the first signal with N points is a frequency domain signal of an OFDM signal, and the second signal with N points is also a frequency domain signal of an OFDM signal. In this implementation, the determining the fourth signal with N/2 points and the fifth signal with N/2 points based on the second signal with N points includes:

IFFT is performed on the second signal with N points, to generate a time domain signal with N points (which may be referred to as the ninth signal with N points), and the time domain signal with N points meets asymmetry. FIG. 8 is a schematic diagram of a time domain signal of an OFDM signal that is of a frequency domain signal with N points at an odd location and that meets an HS constraint according to an embodiment of this application.

Further, the fourth signal with N/2 points and the fifth signal with N/2 points are determined based on the time domain signal with N points. A time domain signal with N/2 points included in the fourth signal with N/2 points includes negative parts, that are set to 0, of a time domain signal with 0 to N/2-1 points (which may also be referred to as first N/2 points) of the time domain signal with N points and positive parts of the time domain signal with 0 to N/2-1 points of the time domain signal with N points.

Alternatively, a time domain signal with N/2 points included in the fourth signal with N/2 points includes positive parts, that are set to 0, of a signal with N/2 to N-1 points (which may also be referred to as last N/2 points) of the time domain signal with N points and an absolute value of negative parts of a signal with N/2 to N-1 points of the time domain signal with N points.

A time domain signal with N/2 points included in the fifth signal with N/2 points includes the positive parts, that are set to 0, of the time domain signal with 0 to N/2-1 points of the time domain signal with N points and an absolute value of the negative parts of the time domain signal with 0 to N/2-1 points of the time domain signal with N points.

Alternatively, a time domain signal with N/2 points included in the fifth signal with N/2 points includes negative parts, that are set to 0, of the time domain signal with N/2 to N-1 points of the time domain signal with N points and positive parts of the time domain signal with N/2 to N-1 points of the time domain signal with N points.

In another possible implementation, the first signal with N points is a time domain signal of an OFDM signal, and the second signal with N points is also a time domain signal of an OFDM signal. In this implementation, the determining the fourth signal with N/2 points and the fifth signal with N/2 points based on the second signal with N points includes:

FFT is performed on the second signal with N points, to generate a frequency domain signal with N points (which may be referred to as the ninth signal with N points), and the frequency domain signal with N points meets asymmetry.

Further, a manner of determining the fourth signal with N/2 points and the fifth signal with N/2 points based on the frequency domain signal with N points is similar to the foregoing possible manner. Details are not described herein again.

The following is described by using an example in which the second signal with N points is a frequency domain signal of an OFDM signal.

After IFFT is performed on a frequency domain signal with N points at an odd location: 0, X(1), 0, X(3), . . . , 0, X(N-1), a time domain signal is obtained and meets asymmetry.

In the time domain signal with 0 to N/2-1 points in FIG. 8, a time domain signal greater than or equal to 0 is defined as A, and a time domain signal less than 0 is defined as −B, where both A and B are time domain signals greater than 0. Alternatively, in the time domain signal with N/2 to N-1 points in FIG. 8, a time domain signal less than 0 is defined as −A, and a time domain signal greater than or equal to 0 is defined as B, where both A and B are time domain signals greater than 0.

Specifically, after IFFT is performed on the frequency domain signal with N points at an odd location: 0, X(1), 0, X(3), . . . , 0, X(N-1), the time domain signal: xo(0), xo(1), . . . , xo(N-1) is obtained, and meets asymmetry. For example, xo(m)=−xo(N/2+m), and a positive part of the N/2 points and a negative part of the N/2 points whose index values are 0 to N/2-1 are extracted.

The positive part of the N/2 points is A=A(0), A(1), . . . , and A(N/2-1). When xo(m)≥0, A(m)=xo(m). When xo(m)<0, A(m)=0. An absolute value of the negative part of the N/2 points is B=B(0), B(1), . . . , and B(N/2-1). When xo(m)≥0, B(m)=0. When xo(m)<0, B(m)=−xo(m).

For another example, the xo(m)=−xo(N/2+m), and a positive part of the N/2 points and a negative part of the N/2 points whose index values are N/2 to N-1 are extracted.

The positive part of the N/2 points is B=B(N/2), B(N/2+1), . . . , and B(N-1). When xo(m)≥0, B(m)=xo(m). When xo(m)<0, B(m)=0. An absolute value of the negative part of the N/2 points is A=A(N/2), A(N/2+1), . . . , and A(N-1). When xo(m)≥0, A(m)=0. When xo(m)<0, A(m)=−xo(m).

S704: Determine the sixth signal with N/2 points and the seventh signal with N/2 points based on the third signal with N points.

Figure 9:
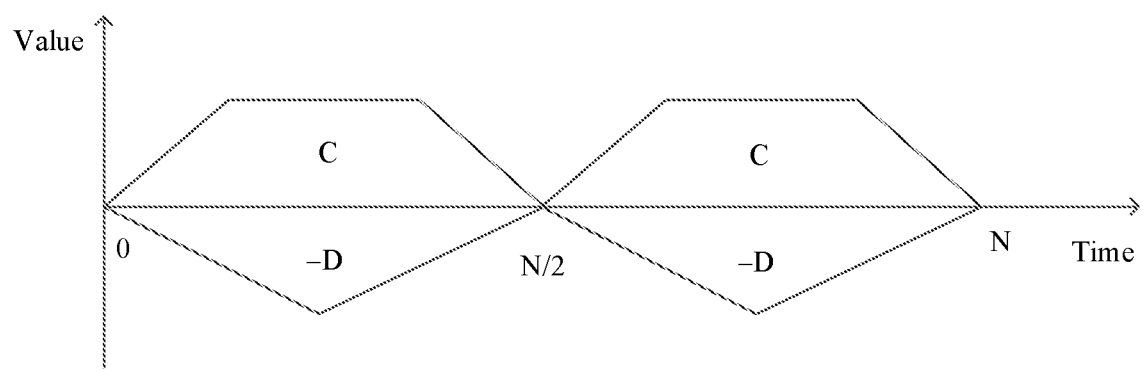
FIG. 9 is a schematic diagram of a time domain signal of an OFDM signal that is of a frequency domain signal with N points at an even location and that meets an HS constraint according to an embodiment of this application.

In a possible implementation, the first signal with N points is a frequency domain signal of an OFDM signal, and the third signal with N points is also a frequency domain signal of an OFDM signal. In this implementation, the determining the sixth signal with N/2 points and the seventh signal with N/2 points based on the third signal with N points includes:

IFFT is performed on the third signal with N points, to generate a time domain signal with N points (which may be referred to as the tenth signal with N points), and the time domain signal with N points meets symmetry. FIG. 9 is a schematic diagram of a time domain signal of an OFDM signal that is of a frequency domain signal with N points at an even location and that meets an HS constraint according to an embodiment of this application.

Further, the sixth signal with N/2 points and the seventh signal with N/2 points are determined based on the time domain signal with N points. A time domain signal with N/2 points included in the sixth signal with N/2 points includes negative parts, that are set to 0, of a time domain signal with 0 to N/2-1 points or N/2 to N-1 points of the time domain signal with N points and positive parts of the time domain signal with 0 to N/2-1 points or N/2 to N-1 points of the time domain signal with N points.

A time domain signal with N/2 points included in the seventh signal with N/2 points includes the positive parts, that are set to 0, of the time domain signal with 0 to N/2-1 points or N/2 to N-1 points of the time domain signal with N points and an absolute value of negative parts of the time domain signal with 0 to N/2-1 points or N/2 to N-1 points of the time domain signal with N points.

In another possible implementation, the first signal with N points is a time domain signal of an OFDM signal, and the third signal with N points is also a time domain signal of an OFDM signal. In this implementation, the determining the sixth signal with N/2 points and the seventh signal with N/2 points based on the third signal with N points includes:

FFT is performed on the third signal with N points, to generate a frequency domain signal with N points (which may be referred to as the tenth signal with N points), and the frequency domain signal with N points meets symmetry.

Further, a manner of determining the sixth signal with N/2 points and the seventh signal with N/2 points based on the frequency domain signal with N points is similar to the foregoing possible manner. Details are not described herein again.

The following is described by using an example in which the third signal with N points is a frequency domain signal of an OFDM signal.

After IFFT is performed on a frequency domain signal with N points at an even location: X(0), 0, X(2), 0, . . . , X(N-2), 0, a time domain signal is obtained and meets symmetry.

In the time domain signal with 0 to N/2-1 points in FIG. 9, a time domain signal greater than or equal to 0 is defined as C, and a time domain signal less than 0 is defined as –D, where both C and D are frequency domain signals greater than 0. Alternatively, in the time domain signal with N/2 to N-1 points in FIG. 9, a time domain signal less than 0 is defined as –D, and a time domain signal greater than or equal to 0 is defined as C, where both C and D are frequency domain signals greater than 0.

Specifically, after IFFT is performed on the frequency domain signal with N points at an even location: X(0), 0, X(2), 0, . . . , X(N-2), 0, the time domain signal: xe(0), xe(1), . . . , xe(N-1) is obtained, and meets symmetry. For example, xe(m)=xe(N/2+m), and a positive part of the N/2 points and a negative part of the N/2 points whose index values are 0 to N/2-1 are extracted.

The positive part of the N/2 points is C=C(0), C(1), . . . , and C(N/2-1). When xe(m)≥0, C(m)=xe(m). When xe(m)<0, C(m)=0. An absolute value of the negative part of the N/2 points is D=D(0), D(1), . . . , and D(N/2-1). When xe(m)0, D(m)=0. When xe(m)<0, D(m)=-xe(m).

For another example, the xe(m)=xe(N/2+m), and a positive part of the N/2 points and a negative part of the N/2 points whose index values are N/2 to N-1 are extracted.

The positive part of the N/2 points is C=C(N/2), C(N/2+1), . . . , and C(N-1). When xe(m)0, C(m)=xe(m). When xe(m)<0, C(m)=0. An absolute value of the negative part of the N/2 points is D=D(N/2), D(N/2+1), . . . , and D(N-1). When xe(m)0, D(m)=0. When xe(m)<0, D(m)=-xe(m).

For ease of understanding, the following uses an example to describe N time domain signals generated by performing IFFT on the frequency domain signal with N points at an odd location and the frequency domain signal with N points at an even location.

For example, the frequency domain signal with N points at an odd location is shown in Table 2, and eight time domain signals generated by performing IFFT on the frequency domain signal with eight points at an odd location is shown in Table 5.

TABLE 5

Signal with N points at an odd location, and signal obtained after IFFT, where N = 8

| -1 | -0.707 | 1 | 0 | 1 | 0.707 | -1 | 0 |
|---|---|---|---|---|---|---|---|

The frequency domain signal with N points at an even location is shown in Table 3, and eight time domain signals generated by performing IFFT on the frequency domain signal with eight points at an even location is shown in Table 6.

TABLE 6

Signal with N points at an even location, and signal obtained after IFFT, where N = 8

| -0.75 | -0.25 | 0.75 | 0.25 | -0.75 | -0.25 | 0.75 | 0.25 |
|---|---|---|---|---|---|---|---|

It should be noted that there is no specific execution sequence between step S703 and step S704. Step S703 may be performed before S704, S704 may be performed before S703, or S703 and S704 may be simultaneously performed. Details are not described herein again.

S705: Determine the eighth signal with 3N/2 points based on the fourth signal with N/2 points, the fifth signal with N/2 points, the sixth signal with N/2 points, and the seventh signal with N/2 points.

Specifically, the determining the eighth signal with 3N/2 points based on the fourth signal with N/2 points, the fifth signal with N/2 points, the sixth signal with N/2 points, and the seventh signal with N/2 points includes:

determining the eleventh signal with N/2 points based on the fourth signal with N/2 points and the sixth signal with N/2 points, where for example, a signal with N/2 points included in the eleventh signal with N/2 points is obtained by summing up a signal at a location corresponding to the fourth signal with N/2 points and a signal at a location corresponding to the sixth signal with N/2 points, a corresponding location may be understood as that a signal at a first location of the eleventh signal with N/2 points is obtained by summing up a signal at a first location of the fourth signal with N/2 points and a signal at a first location of the sixth signal with N/2 points, and by analogy, a signal at a $P^{th}$ location of the eleventh signal with N/2 points is obtained by summing up a signal at a $P^{th}$ location of the fourth signal with N/2 points and a signal at a $P^{th}$ location of the sixth signal with N/2 points;

determining the twelfth signal with N/2 points based on the fourth signal with N/2 points and the seventh signal with N/2 points, where for example, a signal with N/2 points included in the twelfth signal with N/2 points is obtained by summing up a signal at a location corresponding to the fourth signal with N/2 points and a signal at a location corresponding to the seventh signal with N/2 points, a corresponding location may be understood as that a signal at a first location of the twelfth signal with N/2 points is obtained by summing up a signal at a first location of the fourth signal with N/2 points and a signal at a first location of the seventh signal with N/2 points, and by analogy, a signal at a $P^{th}$ location of the twelfth signal with N/2 points is obtained by summing up a signal at a $P^{th}$ location of the fourth signal with N/2 points and a signal at a $P^{th}$ location of the seventh signal with N/2 points;

determining the thirteenth signal with N/2 points based on the fifth signal with N/2 points and the sixth signal with N/2 points, where for example, a signal with N/2 points included in the thirteenth signal with N/2 points is obtained by summing up a signal at a location corresponding to the fifth signal with N/2 points and a signal at a location corresponding to the sixth signal with N/2 points, a corresponding location may be understood as that a signal at a first location of the thirteenth signal with N/2 points is obtained by summing up a signal at a first location of the fifth signal with N/2 points and a signal at a first location of the sixth signal with N/2 points, and by analogy, a signal at a $P^{th}$ location of the thirteenth signal with N/2 points is obtained by summing up a signal at a $P^{th}$ location of the fifth signal with N/2 points and a signal at a $P^{th}$ location of the sixth signal with N/2 points; and determining the fourteenth signal with N/2 points based on the fifth signal with N/2 points and the seventh signal with N/2 points, where for example, a signal with N/2 points included in the fourteenth signal with N/2 points is obtained by summing up a signal at a location corresponding to the fifth signal with N/2 points and a signal at a location corresponding to the seventh signal with N/2 points, a corresponding location may be understood as that a signal at a first location of the fourteenth signal with N/2 points is obtained by summing up a signal at a first location of the fifth signal with N/2 points and a signal at a first location of the seventh signal with N/2 points, and by analogy, a signal at a $P^{th}$ location of the fourteenth signal with N/2 points is obtained by summing up a signal at a $P^{th}$ location of the fifth signal with N/2 points and a signal at a $P^{th}$ location of the seventh signal with N/2 points.

The following is described in a case in which the fourth signal with N/2 points, the fifth signal with N/2 points, the sixth signal with N/2 points, and the seventh signal with N/2 points are time domain signals.

Specifically, a time domain signal with 3N/2 points is output by mixing time domain signals.

As shown in S703, time domain signals obtained after IFFT is performed on the second signal with N points at an odd location may be represented by the fourth signal with N/2 points and the fifth signal with N/2 points (namely, represented by A and B). As shown in S704, time domain signals obtained after IFFT is performed on the third signal with N points at an even location may be represented by the sixth signal with N/2 points and the seventh signal with N/2 points (namely, represented by C and D).

Any three of (A+C), (B+C), (B+D), and (A+D) may be obtained by mixing time domain signals, or (A+C), (B+C), (B+D), and (A+D) may be obtained by mixing time domain signals.

For ease of understanding, the following uses an example to describe how to generate a time domain signal with 3N/2 points by using N time domain signals obtained based on the second signal with N points at an odd location and N time domains obtained based on the third signal with N points at an even location.

For example, the N time domain signals obtained based on the second signal with N points at an odd location is shown in Table 5, and N time domain signals obtained based on the third signal with N points at an even location is shown in Table 6.

It can be seen from Table 5 and FIG. 8 that the N time domain signals obtained based on the second signal with N points at an odd location meet asymmetry. In the time domain signal with 0 to N/2-1 points in FIG. 8, a time domain signal greater than or equal to 0 is defined as A, and a time domain signal less than 0 is defined as –B. Alternatively, in the time domain signal with N/2 to N-1 points in FIG. 8, a time domain signal less than 0 is defined as –A, and a time domain signal greater than or equal to 0 is defined as B. Values of A and B may be shown in Table 7.

TABLE 7

| A | 0 | 0     | 1 | 0 |
|---|---|-------|---|---|
| B | 1 | 0.707 | 0 | 0 |

It can be seen from Table 6 and FIG. 9 that the N time domain signals obtained based on the third signal with N points at an even location meet symmetry. In the time domain signal with 0 to N/2-1 points in FIG. 9, a time domain signal greater than or equal to 0 is defined as C, and a time domain signal less than 0 is defined as –D. Alternatively, in the time domain signal with N/2 to N-1 points in FIG. 9, a time domain signal less than 0 is defined as –D, and a time domain signal greater than or equal to 0 is defined as C. Values of C and D may be shown in Table 8.

TABLE 8

| C | 0    | 0    | 0.75 | 0.25 |
|---|------|------|------|------|
| D | 0.75 | 0.25 | 0    | 0    |

The time domain signal with 3N/2 points generated by using N time domain signals obtained based on the second signal with N points at an odd location and N time domains obtained based on the third signal with N points at an even location includes any three of the four signals shown in Table 9.

TABLE 9

| A + C | 0    | 0     | 1.75 | 0.25 |
| B + C | 1    | 0.707 | 0.75 | 0.25 |
| B + D | 1.75 | 0.957 | 0    | 0    |
| A + D | 0.75 | 0.25  | 1    | 0    |

S706: The transmitter sends an eighth signal with 3N/2 points to the receiver, and correspondingly, the receiver receives the eighth signal with 3N/2 points sent by the transmitter.

It can be known from S705 that the transmitter side obtains and mixes the time domain signals A, B, C, and D, to obtain mixed time domain signals (A+C), (B+C), (B+D), and (A+D), and may send any three of the mixed time domain signals (A+C), (B+C), (B+D), and (A+D) to the receiver.

Alternatively, the transmitter obtains and mixes the time domain signals A, B, C, and D, to obtain any three of mixed time domain signals (A+C), (B+C), (B+D), and (A+D), and may send the three mixed time domain signals to the receiver.

In a possible implementation, the transmitter and the receiver may negotiate, by using signaling, three of (A+C), (B+C), (B+D), and (A+D) that are included in the eighth signal with 3N/2 points that is sent.

Alternatively, in another possible implementation, the transmitter may identify, by using identification information, three of (A+C), (B+C), (B+D), and (A+D) that are included in the eighth signal with 3N/2 points. For example, identifiers corresponding to (A+C), (B+C), (B+D), and (A+D) are respectively #1, #2, #3, and #4, and the three signals with N/2 points included in the eighth signal with 3N/2 points are (A+C), (B+C), and (B+D). Therefore, the transmitter may write identifiers #1, #2, and #3. The identifier may also be referred to as an index. A specific name and representation form of the identification information are not limited in this application, provided that the identification information can be used to identify three of (A+C), (B+C), (B+D), and (A+D) that are included in the eighth signal with 3N/2 points.

Alternatively, in still another possible implementation, three of (A+C), (B+C), (B+D), and (A+D) that are included in the eighth signal with 3N/2 points may be predefined in a protocol. For example, the protocol predefines that the eighth signal with 3N/2 points sent by the transmitter includes (A+C), (B+C), and (B+D). After receiving the eighth signal with 3N/2 points, the receiver can determine that (A+C), (B+C), and (B+D) are received.

It should be understood that the implementation in which the receiver can determine three of the four signals with N/2 points that are included in the received eighth signal with 3N/2 points is merely an example, and does not constitute any limitation on the protection scope of this application. The receiver may alternatively learn, in another manner, of three of the four signals with N/2 points that are included in the received eighth signal with 3N/2 points, for example, determining based on an empirical value. Details are not described in this application.

FIG. 10 is a schematic diagram of an air interface signal according to an embodiment of this application.

It can be seen from (a) in FIG. 10 that time domain signals (A+C), (B+C), and (B+D) in the time domain signals (A+C), (B+C), (B+D), and (A+D) may be sent. It should be understood that (a) in FIG. 10 is merely an example to describe a case in which the time domain signals (A+C), (B+C), and (B+D) are sent. The time domain signals (A+C), (B+C), and (B+D) may be sent in any sequence. For example, other than the time domain signals (A+C), (B+C), and (B+D) sequentially sent in (a) in FIG. 10, time domain signals (A+C), (B+D), and (B+C), (B+C), (A+C), and (B+D), (B+C), (B+D), and (A+C), (B+D), (B+C), and (A+C), or (B+D), (A+C), and (B+C) may be sequentially sent.

In addition, signals included in the time domain signals (A+C), (B+C), and (B+D) may also be sent in any sequence. For example, (A+C) includes a signal #1.1, a signal #1.2, a signal #1.3, and a signal #1.4, (B+C) includes a signal #2.1, a signal #2.2, a signal #2.3, and a signal #2.4, and (B+D) includes a signal #3.1, a signal #3.2, a signal #3.3, and a signal #3.4. When sending the signals included in (A+C), (B+C), and (B+D), the transmitter may send, to the receiver, the signal #1.1, the signal #1.2, the signal #1.3, the signal #1.4, the signal #2.1, the signal #2.2, the signal #2.3, the signal #2.4, the signal #3.1, the signal #3.2, the signal #3.3, and the signal #3.4 in any sequence. The receiver can learn, based on received signals, of that the time domain signals (A+C), (B+C), and (B+D) are received.

When the sequence of sending the time domain signals (A+C), (B+C), and (B+D) is (A+C), (B+C), and (B+D), there are three possible implementations.

In a possible implementation, the transmitter may sequentially send the signal #1.1, the signal #1.2, the signal #1.3, the signal #1.4, the signal #2.1, the signal #2.2, the signal #2.3, the signal #2.4, the signal #3.1, the signal #3.2, the signal #3.3, and the signal #3.4.

In another possible implementation, the transmitter may sequentially send the signal #1.1, the signal #2.1, the signal #3.1, the signal #1.2, the signal #2.2, the signal #3.2, the signal #1.3, the signal #2.3, the signal #3.3, the signal #1.4, the signal #2.4, and the signal #3.4.

In still another possible implementation, the transmitter may send, to the receive end, the signals included in (A+C), (B+C), and (B+D) in any sequence.

When sending the time domain signals (A+C), (B+C), and (B+D) in another sequence (for example, (B+C), (A+C), and (B+D) or (A+C), (B+D), and (B+C)), the transmitter sends the signals included in (A+C), (B+C), and (B+D) in a manner similar to sending the time domain signals (A+C), (B+C), and (B+D) in a sequence of (A+C), (B+C), and (B+D). Details are not described herein again.

For example, when the time domain signal generated through mixing is any one of four possible cases shown in Table 9, the time domain signals sent in (a) in FIG. 10 may be shown in Table 10.

TABLE 10

| A + C | 0 | 0 | 1.75 | 0.25 |
| B + C | 1 | 0.707 | 0.75 | 0.25 |
| B + D | 1.75 | 0.957 | 0 | 0 |

It can be seen from (b) in FIG. 10 that time domain signals (A+C), (B+C), and (A+D) in the time domain signals (A+C), (B+C), (B+D), and (A+D) may be sent. It should be understood that (b) in FIG. 10 is merely an example to describe a case in which the time domain signals (A+C), (B+C), and (A+D) are sent. The time domain signals (A+C), (B+C), and (A+D) may be sent in any sequence. For a specific sequence, refer to sequences enumerated in the time domain signals (A+C), (B+C), and (B+D). Details are not described herein again.

In addition, signals included in the time domain signals (A+C), (B+C), and (A+D) may also be sent in any sequence. A manner of sending the signals included in (A+C), (B+C), and (A+D) is similar to the manner of sending the signals included in (A+C), (B+C), and (B+D). Details are not described herein again.

For example, when the time domain signal generated through mixing is any one of four possible cases shown in Table 9, the time domain signals sent in (b) in FIG. 10 may be shown in Table 11.

TABLE 11

| A + C | 0 | 0 | 1.75 | 0.25 |
| B + C | 1 | 0.707 | 0.75 | 0.25 |
| A + D | 0.75 | 0.25 | 1 | 0 |

It can be seen from (c) in FIG. 10 that time domain signals (A+C), (B+D), and (A+D) in the time domain signals (A+C), (B+C), (B+D), and (A+D) may be sent. It should be understood that (c) in FIG. 10 is merely an example to describe a case in which the time domain signals (A+C), (B+D), and (A+D) are sent. The time domain signals (A+C), (B+D), and (A+D) may be sent in any sequence. For a specific sequence, refer to sequences enumerated in the time domain signals (A+C), (B+C), and (B+D). Details are not described herein again.

In addition, signals included in the time domain signals (A+C), (B+D), and (A+D) may also be sent in any sequence.

A manner of sending the signals included in (A+C), (B+D), and (A+D) is similar to the manner of sending the signals included in (A+C), (B+C), and (B+D). Details are not described herein again.

For example, when the time domain signal generated through mixing is any one of four possible cases shown in Table 9, the time domain signals sent in (c) in FIG. 10 may be shown in Table 12.

TABLE 12

| A + C | 0 | 0 | 1.75 | 0.25 |
|---|---|---|---|---|
| B + D | 1.75 | 0.957 | 0 | 0 |
| A + D | 0.75 | 0.25 | 1 | 0 |

It can be seen from (d) in FIG. 10 that time domain signals (B+C), (B+D), and (A+D) in the time domain signals (A+C), (B+C), (B+D), and (A+D) may be sent. It should be understood that (d) in FIG. 10 is merely an example to describe a case in which the time domain signals (B+C), (B+D), and (A+D) are sent. The time domain signals (B+C), (B+D), and (A+D) may be sent in any sequence. For a specific sequence, refer to sequences enumerated in the time domain signals (A+C), (B+C), and (B+D). Details are not described herein again.

In addition, signals included in the time domain signals (B+C), (B+D), and (A+D) may also be sent in any sequence. A manner of sending the signals included in (B+C), (B+D), and (A+D) is similar to the manner of sending the signals included in (A+C), (B+C), and (B+D). Details are not described herein again.

For example, when the time domain signal generated through mixing is any one of four possible cases shown in Table 9, the time domain signals sent in (d) in FIG. 10 may be shown in Table 13.

TABLE 13

| B + C | 1 | 0.707 | 0.75 | 0.25 |
|---|---|---|---|---|
| B + D | 1.75 | 0.957 | 0 | 0 |
| A + D | 0.75 | 0.25 | 1 | 0 |

S707: Restore the first signal with N points based on the eighth signal with 3N/2 points.

Any three signals of the time domain signals (A+C), (B+C), (B+D), and (A+D) are transmitted through an air interface. Therefore, a signal that is not sent may be restored according to the following expression:

$$(A+C)+(B+D)=(B+C)+(A+D)$$

Therefore, all signals (A+C), (B+C), (B+D), and (A+D) can be obtained.

A first half of the signals are (A+C) and (B+D), and a second half of the signals are (B+C) and (A+D). FIG. 11 is a schematic diagram of a signal after demixing according to an embodiment of this application.

For ease of understanding, the following describes how to obtain the first signal with N points based on the eighth signal with 3N/2 points by using an example in which a received signal is a time domain signal and a signal that needs to be restored is a frequency domain signal.

For example, as shown in Table 14, if the received time domain signal with 3N/2 points is shown in Table 10, the time domain signal A+D is restored (specifically, A+D=(A+C)−(B+C)+(B+D)) based on the time domain signals (A+C), (B+C), and (B+D).

TABLE 14

| A + D | 0.75 | 0.25 | 1 | 0 |
|---|---|---|---|---|

The restored time domain signal with N points is shown in Table 15.

TABLE 15

| Restored signal, where N = 8 | | | | | | | |
|---|---|---|---|---|---|---|---|
| (A + C) − (B + D) | | | | (B + C) − (A + D) | | | |
| −1.75 | −0.957 | 1.75 | 0.25 | 0.25 | 0.457 | −0.25 | 0.25 |

When the received time domain signal with 3N/2 points is shown in Table 11 to Table 13, a process of obtaining the time domain signal with N points based on the time domain signal with 3N/2 points is similar to a process of obtaining the time domain signal with N points based on the time domain signal with 3N/2 points shown in Table 10. Details are not described herein again.

Further, the frequency domain signal with N points is obtained based on the time domain signal with N points.

FFT (if a frequency domain signal is received, IFFT is performed) is performed on a demixed signal, to restore the frequency domain signal with N points: X(0), X(1), . . . , X(N-1).

For example, the time domain signal with N points obtained based on the time domain signal with 3N/2 points is shown in Table 15, and the restored frequency domain signal with N points is shown in Table 16.

TABLE 16

| restored signal, signal obtained after IFFT, where N = 8 | | | | | | | |
|---|---|---|---|---|---|---|---|
| 0 | −3 − j | −3 + j | −1 + 3j | 0 | −1 − 3j | −3 − j | −3 + j |

By comparing the first signal with N points shown in Table 16 with the first signal with N points shown in Table 1, it can be learned that the receiver can restore the first signal with N points based on the received eighth signal with 3N/2 points.

It can be learned from the method procedure shown in FIG. 7 that the receiver may restore the input signal with N points of the transmitter based on the input signal with 3N/2 points. Therefore, spectral efficiency of the signal transmission method provided in embodiments of this application is $\frac{1}{2} \times \frac{2}{3} = \frac{1}{3}$ while meeting an HS constraint. In addition, because there is no direct current bias, power consumption is not increased. Compared with the solution ensuring that a baseband signal of an OFDM signal is a non-negative real number at the expense of spectral efficiency and/or power consumption, the signal transmission method provided in embodiments of this application improves spectral efficiency without increasing power consumption while ensuring that a baseband signal of an OFDM signal is a non-negative real number.

Sequence numbers of the foregoing processes do not mean execution sequences in the foregoing method embodiments. The execution sequences of the processes should be determined based on functions and internal logic of the processes, and should not constitute any limitation on the implementation processes in embodiments of this application. In addition, it is possible that not all operations in the foregoing method embodiment need to be performed.

It should be understood that the transmitter and the receiver in the foregoing method embodiments may perform a part or all of the steps in the embodiments. These steps or operations are merely examples. Embodiments of this application may further include performing other operations or variations of various operations.

It should further be understood that, in embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In addition, it should be noted that embodiments of this application are mainly described by using an example in which the transmitter side separates the to-be-sent first signal with N points into the second signal with N points at an odd location and the third signal with N points at an even location. However, a manner of separating the first signal with N points is not limited in this application. The first signal with N points may alternatively be divided into M groups of signals, provided that a signal obtained after IFFT or FFT is performed on each of the M groups of signals meets symmetry or asymmetry.

For example, the first signal with N points is divided into three groups of signals:

Group 1: 0, X(1), 0, X(3), 0, X(5), . . .
Group 2: X(0), 0, 0, 0, X(4), 0, 0, 0, . . .
Group 3: 0, 0, X(2), 0, 0, 0, X(6), 0, 0, 0, X(10), . . .

The signals in Group 1 meet an asymmetric structure after IFFT or FFT is performed, and the signals in Group 2 and Group 3 meet a symmetric structure after IFFT or FFT is performed.

For another example, the first signal with N points is divided into four groups of signals:

Group 1: 0, X(1), 0, 0, 0, X(5), . . .
Group 2: 0, 0, 0, X(3), 0, 0, 0, X(7), . . .
Group 3: X(0), 0, 0, 0, X(4), 0, 0, 0, . . .
Group 4: 0, 0, X(2), 0, 0, 0, X(6), 0, 0, 0, X(10), . . .

The signals in Group 1 and Group 2 meet an asymmetric structure after IFFT or FFT is performed, and the signals in Group 3 and Group 4 meet a symmetric structure after IFFT or FFT is performed.

After the signals that meet symmetry or asymmetry are obtained, similarly, the obtained signals are combined and sent, and then the receiver demodulates the signals. For a specific combination manner and a demodulation manner of the receiver side, refer to descriptions in the foregoing embodiments.

For example, when the first signal with N points is divided into the four groups of signals, for Group 1 and Group 3, the transmitter side may combine and send the two groups of signals in the manner of processing the second signal with N points and the third signal with N points in embodiments of this application, and the receiver side may perform demodulation in the manner of processing the eighth signal with 3N/2 points in embodiments of this application. Similarly, for Group 2 and Group 4, the transmitter side may combine and send the two groups of signals in the manner of processing the second signal with N points and the third signal with N points in embodiments of this application, and the receiver side may perform demodulation in the manner of processing the eighth signal with 3N/2 points in embodiments of this application.

It should be noted that combining, sending, and demodulating the plurality of groups of signals is merely an example, and does not constitute any limitation on the protection scope of this application. After more than two groups of signals that meet an asymmetric structure or a symmetric structure through IFFT or FFT are obtained, the more than two groups of signals may be combined, sent, and demodulated in another manner. Details are not described herein again.

The foregoing describes in detail the signal transmission method provided in embodiments of this application with reference to FIG. 7 to FIG. 11. The following describes in detail a signal transmission apparatus provided in embodiments of this application with reference to FIG. 12 to FIG. 15.

FIG. 12 is a schematic diagram of a signal transmission apparatus 1200 according to this application. As shown in FIG. 12, the apparatus 1200 includes an obtaining unit 1210, a processing unit 1220, and a sending unit 1230.

The signal transmission apparatus 1200 may be configured to implement a function of the transmitter in any one of the method embodiments. For example, the signal transmission apparatus 1200 may be a transmitter.

The signal transmission apparatus 1200 may be used as a transmitter, and perform steps performed by the transmitter in the method embodiments. The obtaining unit 1210 and/or the sending unit 1230 may be configured to support the signal transmission apparatus 1200 in performing communication, for example, performing sending and/or receiving performed by the transmitter in FIG. 7. The processing unit 1220 may be configured to support the signal transmission apparatus 1200 in performing processing in the method embodiments, for example, performing processing performed by the transmitter in FIG. 7.

Optionally, the signal transmission apparatus 1200 may further include a storage unit 1240 (not shown in FIG. 12), configured to store program code and data of the signal transmission apparatus 1200.

Specifically, refer to the following descriptions:

The obtaining unit 1210 is configured to obtain a first signal with N points.

The processing unit 1220 is configured to determine a second signal with N points and a third signal with N points based on the first signal with N points. The second signal with N points is used to determine a fourth signal with N/2 points and a fifth signal with N/2 points, and the third signal with N points is used to determine a sixth signal with N/2 points and a seventh signal with N/2 points.

The processing unit 1220 is further configured to determine an eighth signal with 3N/2 points based on the fourth signal with N/2 points, the fifth signal with N/2 points, the sixth signal with N/2 points, and the seventh signal with N/2 points.

The sending unit 1230 is configured to send the eighth signal with 3N/2 points.

The second signal with N points is obtained by setting a signal at an even location in the first signal with N points to 0, and the third signal with N points is obtained by setting a signal at an odd location in the first signal with N points to 0.

The apparatus 1200 corresponds to the transmitter in the method embodiments. The apparatus 1200 may be the transmitter in the method embodiments, or a chip or a functional module inside the transmitter in the method embodiments. Corresponding units of the apparatus 1200 are configured to perform corresponding steps performed by the transmitter in the method embodiment shown in FIG. 7.

The obtaining unit 1210 in the apparatus 1200 performs steps of obtaining performed by the transmitter in the method embodiments, for example, performing step S701 of obtaining the first signal with N points by the access network device in FIG. 7.

The sending unit 1230 in the apparatus 1200 is configured to implement a function of sending a message to another device, for example, performing step S706 of sending the eighth signal with 3N/2 points to the receiver in FIG. 7.

The processing unit 1220 in the apparatus 1200 performs steps implemented or processed inside the transmitter in the method embodiments, for example, performing step S702 of determining the second signal with N points and the third signal with N points, step S703 of determining the fourth signal with N/2 points and the fifth signal with N/2 points, step S704 of determining the sixth signal with N/2 points and the seventh signal with N/2 points, and step S705 of determining the eighth signal with 3N/2 points in FIG. 7.

The obtaining unit 1210 and the sending unit 1230 may form a transceiver unit that has both receiving and sending functions. The processing unit 1220 may be a processor. The sending unit 1230 may be a transmitter. The obtaining unit 1210 may be a receiver. The receiver and the transmitter may be integrated to constitute a transceiver.

FIG. 13 is a schematic diagram of a structure of a transmitter 1300 applicable to an embodiment of this application. The transmitter 1300 may be applied to the system shown in FIG. 1. For ease of description, FIG. 13 shows only main components of the transmitter 1300. As shown in FIG. 13, the transmitter 1300 includes a processor 1310, a memory 1320, and a transceiver 1330. The processor 1310 is configured to control the transceiver 1330 to receive and send a signal. The memory 1320 is configured to store a computer program. The processor 1310 is configured to invoke the computer program from the memory 1320 and run the computer program, to perform a corresponding procedure and/or operation performed by user equipment in the signal transmission method provided in this application. Details are not described herein again.

A person skilled in the art may understand that, for ease of description, FIG. 13 shows only one memory and one processor. In an actual transmitter, there may be a plurality of processors and a plurality of memories. The memory may also be referred to as a storage medium, a storage device, or the like. This is not limited in this embodiment of this application.

FIG. 14 is a schematic diagram of a signal transmission apparatus 1400 according to this application. As shown in FIG. 14, the apparatus 1400 includes a receiving unit 1410 and a processing unit 1420.

The signal transmission apparatus 1400 may be configured to implement a function of the receiver in any one of the method embodiments. For example, the signal transmission apparatus 1400 may be a receiver.

The signal transmission apparatus 1400 may be used as a receiver, and perform steps performed by the receiver in the method embodiments. The receiving unit 1410 and/or a sending unit may be configured to support the signal transmission apparatus 1400 in performing communication, for example, performing sending and/or receiving performed by the receiver in FIG. 7.

Optionally, the signal transmission apparatus 1400 may further include the sending unit 1430 (not shown in FIG. 14), configured to support the signal transmission apparatus 1400 in performing sending in the method embodiments, for example, performing sending performed by the receiver in FIG. 7.

Optionally, the signal transmission apparatus 1400 may further include a storage unit 1440 (not shown in FIG. 14), configured to store program code and data of the signal transmission apparatus 1400.

Specifically, refer to the following descriptions:

The receiving unit 1410 is configured to obtain an eighth signal with 3N/2 points. The eighth signal with 3N/2 points includes three signals of an eleventh signal with N/2 points, a twelfth signal with N/2 points, a thirteenth signal with N/2 points, and a fourteenth signal with N/2 points.

The processing unit 1420 is configured to determine a signal in the eleventh signal with N/2 points, the twelfth signal with N/2 points, the thirteenth signal with N/2 points, and the fourteenth signal with N/2 points other than the three signals included in the eighth signal.

The processing unit 1420 is further configured to determine a first signal with N points based on the eleventh signal with N/2 points, the twelfth signal with N/2 points, the thirteenth signal with N/2 points, and the fourteenth signal with N/2 points.

N is a positive even number.

The apparatus 1400 corresponds to the receiver in the method embodiments. The apparatus 1400 may be the receiver in the method embodiments, or a chip or a functional module inside the receiver in the method embodiments. Corresponding units of the apparatus 1400 are configured to perform corresponding steps performed by the receiver in the method embodiment shown in FIG. 7.

The receiving unit 1410 in the apparatus 1400 performs the step in which the receiver receives a message sent by another device in the method embodiments, for example, performing step S701 of receiving the eighth signal with 3N/2 points sent by the transmitter in FIG. 7.

The processing unit 1420 in the apparatus 1400 performs steps implemented or processed inside the receiver in the method embodiments, for example, performing step S707 of restoring the first signal with N points in FIG. 7.

The signal transmission apparatus shown in the apparatus 1400 may further include the sending unit (not shown in FIG. 14), and the sending unit performs the step of sending performed by the receiver in the method embodiments.

The receiving unit 1410 and the sending unit may form a transceiver unit that has both receiving and sending functions. The processing unit 1420 may be a processor. The receiving unit 1410 may be a receiver. The sending unit may be a transmitter. The receiver and the transmitter may be integrated to constitute a transceiver.

As shown in FIG. 15, an embodiment of this application further provides a receiver 1500. The receiver 1500 includes a processor 1510, a memory 1520, and a transceiver 1530. The memory 1520 stores instructions or a program, and the processor 1510 is configured to execute the instructions or the program stored in the memory 1520. When the instructions or the program stored in the memory 1520 is executed, the transceiver 1530 is configured to perform operations performed by the receiving unit 1410 in the apparatus 1400 shown in FIG. 14.

This application further provides a computer-readable storage medium. The computer-readable storage medium stores a computer program or instructions. When the computer program or the instructions is/are run on a computer, steps performed by the transmitter in the method shown in FIG. 7 are performed.

This application further provides a computer-readable storage medium. The computer-readable storage medium stores a computer program or instructions. When the computer program or the instructions is/are run on a computer, steps performed by the receiver in the method shown in FIG. 7 are performed.

This application further provides a computer program product including instructions. When the computer program product runs on a computer, steps performed by the transmitter in the method shown in FIG. 7 are performed.

This application further provides a computer program product including instructions. When the computer program product runs on a computer, steps performed by the receiver in the method shown in FIG. 7 are performed.

This application provides an apparatus configured to perform the method performed by the transmitter or the receiver. The apparatus includes at least one input interface (Input(s)), a logic circuit, and at least one output interface (Output(s)). Optionally, the logic circuit may be a chip or another integrated circuit that can implement the method in this application.

The input interface is configured to input or receive data. The output interface is configured to output or send data. The logic circuit is configured to perform the possible methods.

For example, when the apparatus is a transmitter, the input interface may be configured to obtain the first signal with N points. The output interface may be configured to output the eighth signal with 3N/2 points. The logic circuit is configured to obtain the eighth signal with 3N/2 points in various possible manners in the embodiments.

For example, when the apparatus is a transmitter, the input interface may be configured to obtain the eighth signal with 3N/2 points. The logic circuit is configured to obtain the first signal with N points in various possible manners in the embodiments. The output interface may be configured to output the first signal with N points.

This application further provides a chip, including a processor. The processor is configured to read and run a computer program stored in a memory, to perform a corresponding operation and/or procedure performed by the transmitter in the signal transmission method provided in this application. Optionally, the chip further includes a memory. The memory and the processor are connected to the memory by using a circuit or a wire. The processor is configured to read and execute the computer program in the memory. Further, optionally, the chip system further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

This application further provides a chip, including a processor. The processor is configured to read and run a computer program stored in a memory, to perform a corresponding operation and/or procedure performed by the receiver in the signal transmission method provided in this application. Optionally, the chip further includes a memory. The memory and the processor are connected to the memory by using a circuit or a wire. The processor is configured to read and execute the computer program in the memory. Further, optionally, the chip system further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

It should be noted that the processor in this application may be a central processing unit (CPU), an application-specific integrated circuit (ASIC), or one or more integrated circuits configured to implement embodiments of this application, for example, one or more digital signal processors (DSP) or one or more field programmable gate arrays (FPGA).

A specific representation form of the processor is not limited in this application, provided that the processor can be configured to complete an internal processing function of a corresponding device. A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It should be understood that, the foregoing chip may be alternatively replaced with a chip system, and details are not described herein. In this application, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

Units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, function units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In addition, the term "and/or" in this application describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   obtaining a first signal with N points, wherein N is a positive even number;
   determining a second signal with N points and a third signal with N points based on the first signal, wherein a fourth signal with N/2 points and a fifth signal with N/2 points are determined based on the second signal, and wherein a sixth signal with N/2 points and a seventh signal with N/2 points are determined based on the third signal;
   determining an eighth signal with 3N/2 points based on the fourth signal, the fifth signal, the sixth signal, and the seventh signal, wherein the eighth signal is an orthogonal frequency division multiplexing (OFDM) signal to be carried in an optical signal; and
   sending the eighth signal in the optical signal,
   wherein the second signal is obtained by setting a signal at an even location in the first signal to 0, and wherein the third signal is obtained by setting another signal at an odd location in the first signal to 0.

2. The method according to claim 1, further comprising:
   performing inverse fast Fourier transform (IFFT) or fast Fourier transform FFT on the second signal to obtain a ninth signal with N points,
   wherein the fourth signal is obtained by:
      setting negative parts of first N/2 points of the ninth signal to 0, or
      setting positive parts of last N/2 points of the ninth signal to 0 and calculating an absolute value of negative parts of the last N/2 points of the ninth signal, and
   wherein the fifth signal is obtained by:
      setting positive parts of the first N/2 points of the ninth signal to 0 and calculating an absolute value of the negative parts of the first N/2 points of the ninth signal, or
      setting negative parts of the last N/2 points of the ninth signal to 0.

3. The method according to claim 1, further comprising:
   performing IFFT or FFT on the third signal to obtain a tenth signal with N points,
   wherein the sixth signal is obtained by setting negative parts of first N/2 points or last N/2 points of the tenth signal to 0, and
   wherein the seventh signal is obtained by setting positive parts of the first N/2 points or the last N/2 points of the tenth signal to 0 and calculating an absolute value of the negative parts of the first N/2 points or the last N/2 points of the tenth signal.

4. The method according to claim 1,
   wherein the eighth signal comprises either an eleventh signal with N/2 points or a twelfth signal with N/2 points, a thirteenth signal with N/2 points, and a fourteenth signal with N/2 points, or the eighth signal comprises either the thirteenth signal or the fourteenth signal, the eleventh signal, and the twelfth signal,
   wherein the eleventh signal is determined based on the fourth signal and the sixth signal,
   wherein the twelfth signal is determined based on the fourth signal and the seventh signal,
   wherein the thirteenth signal is determined based on the fifth signal and the sixth signal, and
   wherein the fourteenth signal is determined based on the fifth signal and the seventh signal.

5. The method according to claim 4,
   wherein determining the eleventh signal based on the fourth signal and the sixth signal comprises:
      summing up a fifteenth signal at a first location corresponding to the fourth signal and a sixteenth signal at a second location corresponding to the sixth signal to obtain a seventeenth signal with N/2 points comprised in the eleventh signal with N/2 points,
   wherein determining the twelfth signal based on the fourth signal and the seventh signal comprises:
      summing up the fifteenth signal at the first location corresponding to the fourth signal and an eighteenth signal at a third location corresponding to the seventh signal to obtain a nineteenth signal with N/2 points comprised in the twelfth signal,
   wherein determining the thirteenth signal based on the fifth signal and the sixth signal comprises:
      summing up a twentieth signal at a fourth location corresponding to the fifth signal and the sixteenth signal at the second location corresponding to the sixth signal to obtain a twenty-first signal with N/2 points comprised in the thirteenth signal, and wherein determining the fourteenth signal based on the fifth signal and the seventh signal comprises:
summing up a twenty-second signal at the fourth location corresponding to the fifth signal and the seventeenth signal at the third location corresponding to the seventh signal to obtain a twenty-third signal with N/2 points comprised in the fourteenth signal.

6. A method, comprising:
obtaining an eighth signal with 3N/2 points, wherein the eighth signal is an orthogonal frequency division multiplexing (OFDM) signal carried in an optical signal, and wherein the eighth signal comprises three signals of an eleventh signal with N/2 points, a twelfth signal with N/2 points, a thirteenth signal with N/2 points, or a fourteenth signal with N/2 points;
determining a signal from the eleventh signal, the twelfth signal, the thirteenth signal, and the fourteenth signal other than the three signals comprised in the eighth signal; and
determining a first signal with N points based on the eleventh signal, the twelfth signal, the thirteenth signal, and the fourteenth signal,
wherein N is a positive even number.

7. The method according to claim 6, wherein the determining the first signal based on the eleventh signal, the twelfth signal, the thirteenth signal, and the fourteenth signal comprises:
determining a fifteenth signal with N points based on the eleventh signal, the twelfth signal, the thirteenth signal, and the fourteenth signal; and
performing IFFT or FFT on the fifteenth signal to obtain the first signal with N points.

8. The method according to claim 7, wherein the determining the fifteenth signal based on the eleventh signal, the twelfth signal, the thirteenth signal, and the fourteenth signal comprises:
determining a sixteenth signal with first N/2 points of the fifteenth signal based on a first difference between a seventeenth signal at a first location corresponding to the eleventh signal and a eighteenth signal at a second location corresponding to the fourteenth signal; and
determining a nineteenth signal with last N/2 points of the fifteenth signal based on a second difference between a twentieth signal at a third location corresponding to the thirteenth signal and a twenty-first signal at a fourth location corresponding to the twelfth signal.

9. The method according to claim 8,
wherein the eighth signal comprises either the eleventh signal or the twelfth signal, the thirteenth signal, and the fourteenth signal, or the eighth signal comprises either the thirteenth signal or the fourteenth signal, the eleventh signal, and the twelfth signal,
wherein the eleventh signal is obtained by:
summing up a twenty-second signal at a fifth location corresponding to a fourth signal with N/2 points and a twenty-third signal at a sixth location corresponding to a sixth signal with N/2 points,
wherein the twelfth signal is obtained by:
summing up the twenty-second signal at the fifth location corresponding to the fourth signal and a twenty-fourth signal at a seventh location corresponding to a seventh signal with N/2 points,
wherein the thirteenth signal is obtained by:
summing up a twenty-fifth signal at an eighth location corresponding to a fifth signal with N/2 points and the twenty-third signal at the sixth location corresponding to the sixth signal, and wherein the fourteenth signal with N/2 points is obtained by:
summing up the twenty-fifth signal at the eighth location corresponding to the fifth signal and the twenty-fourth signal at the seventh location corresponding to the seventh signal.

10. The method according to claim 9, further comprising:
when the eighth signal comprises either the eleventh signal or the twelfth signal, the thirteenth signal, and the fourteenth signal:
adding the twenty-first signal at the fourth location corresponding to the twelfth signal to the twentieth signal at the third location corresponding to the thirteenth signal and subtracting the eighteenth signal at the second location corresponding to the fourteenth signal to obtain the eleventh signal.

11. The method according to claim 9, further comprising:
when the eighth signal comprises either the eleventh signal or the twelfth signal, the thirteenth signal, and the fourteenth signal:
adding the seventeenth signal at the first location corresponding to the eleventh signal to the eighteenth signal at the second location corresponding to the fourteenth signal and subtracting the twentieth signal at the third location corresponding to the thirteenth signal to obtain the twelfth signal.

12. The method according to claim 9, further comprising:
when the eighth signal comprises either the thirteenth signal or the fourteenth signal, the eleventh signal, and the twelfth signal:
adding the seventeenth signal at the first location corresponding to the eleventh signal to the eighteenth signal at the second location corresponding to the fourteenth signal and subtracting the twenty-first signal at the fourth location corresponding to the twelfth signal to obtain the thirteenth signal.

13. The method according to claim 9, further comprising:
when the eighth signal comprises either the thirteenth signal or the fourteenth signal, the eleventh signal, and the twelfth signal:
adding the twenty-first signal at the fourth location corresponding to the twelfth signal to the twentieth signal at the third location corresponding to the thirteenth signal and subtracting the signal at the first location corresponding to the eleventh signal to obtain the fourteenth signal.

14. An apparatus, comprising:
a processor, wherein the processor is coupled to a memory storing a computer instructions, that when executed by the processor, cause the apparatus to perform operations including:
obtaining a first signal with N points, wherein N is a positive even number;
determining a second signal with N points and a third signal with N points based on the first signal, wherein a fourth signal with N/2 points and a fifth signal with N/2 points are determined based on the second signal, and wherein a sixth signal with N/2 points and a seventh signal with N/2 points are determined based on the third signal;
determining an eighth signal with 3N/2 points based on the fourth signal, the fifth signal, the sixth signal, and the seventh signal, wherein the eighth signal is an orthogonal frequency division multiplexing (OFDM) signal to be carried in an optical signal; and
sending the eighth signal in the optical signal, wherein the second signal is obtained by setting a signal at an even location in the first signal to 0, and wherein the third signal is obtained by setting another signal at an odd location in the first signal to 0.

15. The apparatus according to claim 14, the operations further including:
performing inverse fast Fourier transform (IFFT) or fast Fourier transform FFT on the second signal, to obtain a ninth signal with N points,
wherein the fourth signal is obtained by:
setting negative parts of first N/2 points of the ninth signal to 0, or
setting positive parts of last N/2 points of the ninth signal to 0 and calculating an absolute value of negative parts of the last N/2 points of the ninth signal, and
wherein the fifth signal is obtained by:
setting positive parts of the first N/2 points of the ninth signal to 0 and calculating an absolute value of the negative parts of the first N/2 points of the ninth signal, or
setting negative parts of the last N/2 points of the ninth signal to 0.

16. The apparatus according to claim 14, the operations further comprising:
performing IFFT or FFT on the third signal to obtain a tenth signal with N points,
wherein the sixth signal is obtained by setting negative parts of first N/2 points or last N/2 points of the tenth signal with N points to 0, wherein
the seventh signal with N/2 points is obtained by setting positive parts of the first N/2 points or the last N/2 points of the tenth signal to 0 and calculating an absolute value of the negative parts of the first N/2 points or the last N/2 points of the tenth signal.

17. The apparatus according to claim 14,
wherein the eighth signal comprises either an eleventh signal with N/2 points or a twelfth signal with N/2 points, a thirteenth signal with N/2 points, and a fourteenth signal with N/2 points or the eighth signal comprises either the thirteenth signal or the fourteenth signal, the eleventh signal with N/2 points, and the twelfth signal,
wherein the eleventh signal is determined based on the fourth signal and the sixth signal,
wherein the twelfth signal is determined based on the fourth signal and the seventh signal,
wherein the thirteenth signal is determined based on the fifth signal and the sixth signal, and
wherein the fourteenth signal is determined based on the fifth signal and the seventh signal.

18. The apparatus according to claim 17,
wherein determining the eleventh signal based on the fourth signal and the sixth signal comprises:
summing up a fifteenth signal at a first location corresponding to the fourth signal and a sixteenth signal at a second location corresponding to the sixth signal to obtain a seventeenth signal with N/2 points comprised in the eleventh signal with N/2 points,
wherein determining the twelfth signal based on the fourth signal and the seventh signal comprises:
summing up the fifteenth signal at the first location corresponding to the fourth signal and an eighteenth signal at a third location corresponding to the seventh signal to obtain a nineteenth signal with N/2 points comprised in the twelfth signal,
wherein determining the thirteenth signal based on the fifth signal and the sixth signal comprises:
summing up a twentieth signal at a fourth location corresponding to the fifth signal and the sixteenth signal at the second location corresponding to the sixth signal to obtain a twenty-first signal with N/2 points comprised in the thirteenth signal, and
wherein determining the fourteenth signal based on the fifth signal and the seventh signal comprises:
summing up a twenty-second signal at the fourth location corresponding to the fifth signal and the seventeenth signal at the third location corresponding to the seventh signal to obtain a twenty-third signal with N/2 points comprised in the fourteenth signal.

19. The apparatus according to claim 14, wherein the memory is integrated into the processor.

20. The apparatus according to claim 14, wherein the apparatus is a chip.

* * * * *

UNITED STATES PATENT AND TRADEMARK OFFICE
CERTIFICATE OF CORRECTION

PATENT NO. : 11,902,073 B2
APPLICATION NO. : 17/986406
DATED : February 13, 2024
INVENTOR(S) : Li et al.

It is certified that error appears in the above-identified patent and that said Letters Patent is hereby corrected as shown below:

In the Claims

In Column 36, in Claim 2, Line 3, delete "FFT" and insert -- (FFT) --.

In Column 39, in Claim 15, Line 8, delete "FFT" and insert -- (FFT) --.

Signed and Sealed this
Thirtieth Day of April, 2024

*Katherine Kelly Vidal*

Katherine Kelly Vidal
*Director of the United States Patent and Trademark Office*